United States Patent
Chapman et al.

(10) Patent No.: US 10,444,615 B2
(45) Date of Patent: Oct. 15, 2019

(54) RETROREFLECTIVE SHEETING FOR PROJECTOR-BASED DISPLAY SYSTEM

(71) Applicants: Avery Dennison Corporation, Glendale, CA (US); MirraViz, Fremont, CA (US)

(72) Inventors: Steven R. Chapman, Glenview, IL (US); Michael Wang, Sunnyvale, CA (US)

(73) Assignees: Avery Dennison Corporation, Glendale, CA (US); Mirraviz, Fremont, CA (US)

( * ) Notice: Subject to any disclaimer, the term of this patent is extended or adjusted under 35 U.S.C. 154(b) by 0 days.

(21) Appl. No.: 16/116,060

(22) Filed: Aug. 29, 2018

(65) Prior Publication Data

US 2019/0064646 A1 Feb. 28, 2019

Related U.S. Application Data

(60) Provisional application No. 62/551,288, filed on Aug. 29, 2017.

(51) Int. Cl.
*G03B 21/60* (2014.01)
*G02B 5/124* (2006.01)
(Continued)

(52) U.S. Cl.
CPC ............ *G03B 21/60* (2013.01); *G02B 5/124* (2013.01); *G03B 21/10* (2013.01); *G03B 21/56* (2013.01); *G03B 21/58* (2013.01); *G03B 21/62* (2013.01)

(58) Field of Classification Search
CPC .................................................... G03B 21/56
(Continued)

(56) References Cited

U.S. PATENT DOCUMENTS 3,817,596 A * 6/1974 Tanaka ............... G02B 5/124
 359/532
3,833,285 A * 9/1974 Heenan ............... G02B 5/122
 359/551

(Continued)

FOREIGN PATENT DOCUMENTS

EP 0269329 6/1988
EP 1081511 3/2001
(Continued)

OTHER PUBLICATIONS

Dominic C. O'Brien, Grahame E. Faulkner, and David J. Edwards, "Optical properties of a retroreflecting sheet," Appl. Opt. 38, 4137-4144 (1999) (Year: 1999).*

(Continued)

*Primary Examiner* — Clayton E. LaBalle
*Assistant Examiner* — Kevin C Butler
(74) *Attorney, Agent, or Firm* — Kilpatrick Townsend & Stockton LLP

(57) ABSTRACT

Provided herein is a retroreflective article comprising a retroreflective film and a plurality of isosceles triangular pyramid prisms embossed on the back surface of the retroreflective film. The prisms are configured such that the article reflects an incident light beam into two reflected light beams that are offset from and on opposite sides of the incident light beam. The two reflected light beams can provide two viewing zones located at different positions relative to the incident light beam source.

30 Claims, 17 Drawing Sheets

(51) Int. Cl.
  *G03B 21/58* (2014.01)
  *G03B 21/62* (2014.01)
  *G03B 21/56* (2006.01)
  *G03B 21/10* (2006.01)
(58) Field of Classification Search
  USPC .................................................... 359/449
  See application file for complete search history.

(56) References Cited

U.S. PATENT DOCUMENTS

| | | | | |
|---|---|---|---|---|
| 4,076,383 A * | 2/1978 | Heasley | ........... | G02B 5/124 359/531 |
| 4,202,600 A * | 5/1980 | Burke | ........... | G02B 5/124 359/514 |
| 4,349,598 A * | 9/1982 | White | ........... | G02B 5/124 359/530 |
| 4,588,258 A * | 5/1986 | Hoopman | ........... | G02B 5/124 359/530 |
| 4,775,219 A * | 10/1988 | Appeldorn | ........... | G02B 5/124 359/532 |
| 4,895,428 A * | 1/1990 | Nelson | ........... | G02B 5/124 359/530 |
| 4,938,563 A * | 7/1990 | Nelson | ........... | G02B 5/124 359/530 |
| 5,122,902 A * | 6/1992 | Benson | ........... | G02B 5/124 359/529 |
| 5,138,488 A | 8/1992 | Szczech | | |
| 5,301,005 A * | 4/1994 | deVos | ........... | G01C 15/002 356/141.1 |
| 5,585,164 A * | 12/1996 | Smith | ........... | G02B 5/122 359/530 |
| 5,691,846 A * | 11/1997 | Benson, Jr. | ........... | B29C 39/148 156/245 |
| 5,696,627 A * | 12/1997 | Benson | ........... | G02B 5/124 359/529 |
| 5,706,132 A * | 1/1998 | Nestegard | ........... | G02B 5/124 359/529 |
| 5,721,640 A * | 2/1998 | Smith | ........... | G02B 5/124 359/530 |
| 5,734,501 A * | 3/1998 | Smith | ........... | G02B 5/124 359/529 |
| 5,764,413 A * | 6/1998 | Smith | ........... | G02B 5/124 264/2.5 |
| 5,770,124 A * | 6/1998 | Marecki | ........... | G02B 5/124 264/1.36 |
| 5,840,405 A * | 11/1998 | Shusta | ........... | G02B 5/124 428/156 |
| 5,840,406 A * | 11/1998 | Nilsen | ........... | G02B 5/124 428/156 |
| 5,854,709 A | 12/1998 | Couzin | | |
| 5,889,615 A * | 3/1999 | Dreyer | ........... | G02B 5/124 264/1.9 |
| 5,898,523 A * | 4/1999 | Smith | ........... | G02B 5/124 359/530 |
| 5,981,032 A * | 11/1999 | Smith | ........... | B29D 11/00625 428/167 |
| 6,010,609 A | 1/2000 | Mimura et al. | | |
| 6,036,322 A * | 3/2000 | Nilsen | ........... | G02B 5/124 359/529 |
| 6,045,230 A * | 4/2000 | Dreyer | ........... | B44F 1/045 359/518 |
| 6,048,069 A | 4/2000 | Nagaoka et al. | | |
| 6,083,607 A | 7/2000 | Mimura et al. | | |
| 6,120,879 A | 9/2000 | Szczech et al. | | |
| 6,258,443 B1 | 7/2001 | Nilsen et al. | | |
| 6,274,221 B2 | 8/2001 | Smith et al. | | |
| 6,282,026 B1 * | 8/2001 | Dreyer | ........... | G02B 5/124 359/518 |
| 6,302,992 B1 * | 10/2001 | Smith | ........... | B29D 11/00625 156/268 |
| 6,325,515 B1 * | 12/2001 | Coderre | ........... | G02B 5/124 264/1.9 |
| 6,350,034 B1 | 2/2002 | Fleming et al. | | |
| 6,386,855 B1 | 5/2002 | Luttrell et al. | | |
| 6,390,629 B1 * | 5/2002 | Mimura | ........... | G02B 5/124 359/529 |
| 6,568,817 B1 | 5/2003 | Mimura et al. | | |
| 6,656,571 B2 | 12/2003 | Benson et al. | | |
| 6,685,323 B1 | 2/2004 | Mimura et al. | | |
| 6,802,616 B2 | 10/2004 | Mimura | | |
| 6,817,724 B2 | 11/2004 | Mimura et al. | | |
| 6,883,921 B2 | 4/2005 | Mimura et al. | | |
| 6,890,634 B1 * | 5/2005 | Yoon | ........... | G02B 5/124 359/515 |
| 6,902,280 B2 | 6/2005 | Couzin | | |
| 6,935,756 B2 | 8/2005 | Sewall et al. | | |
| 6,942,350 B2 | 9/2005 | Mimura et al. | | |
| 6,967,053 B1 * | 11/2005 | Mullen | ........... | A42B 3/061 359/529 |
| 7,018,573 B2 * | 3/2006 | Wulff | ........... | B29C 55/04 264/1.9 |
| 7,045,278 B2 | 5/2006 | Ihara et al. | | |
| 7,195,360 B2 | 3/2007 | Bacon, Jr. et al. | | |
| 7,314,284 B2 | 1/2008 | Koizumi et al. | | |
| 7,329,447 B2 | 2/2008 | Chirhart et al. | | |
| 7,347,571 B2 | 3/2008 | Bacon, Jr. | | |
| 7,360,907 B2 | 4/2008 | Ihara et al. | | |
| 7,506,987 B2 * | 3/2009 | Nilsen | ........... | G02B 5/124 359/529 |
| 7,518,676 B2 | 4/2009 | Minoura et al. | | |
| 7,815,319 B2 | 10/2010 | Mimura | | |
| 7,938,549 B2 | 5/2011 | Mimura | | |
| 7,950,813 B2 | 5/2011 | Mimura | | |
| 7,980,710 B2 | 7/2011 | Hayashi et al. | | |
| 8,297,761 B2 | 10/2012 | Thakkar et al. | | |
| 8,317,341 B2 | 11/2012 | Kim | | |
| 8,388,154 B2 | 3/2013 | Mimura et al. | | |
| 8,459,806 B2 | 6/2013 | Mimura et al. | | |
| 8,506,095 B2 | 8/2013 | Bacon, Jr. et al. | | |
| 8,511,840 B2 | 8/2013 | Mimura et al. | | |
| 8,517,546 B2 | 8/2013 | Mimura | | |
| 8,668,341 B2 | 3/2014 | Caswell et al. | | |
| 8,783,879 B2 | 7/2014 | Smith et al. | | |
| 8,852,722 B2 | 10/2014 | Benson et al. | | |
| 8,928,625 B2 | 1/2015 | Chapman et al. | | |
| 8,950,877 B2 | 2/2015 | Northey et al. | | |
| 8,970,949 B2 | 3/2015 | Suzuki et al. | | |
| 9,050,762 B2 | 6/2015 | Scott | | |
| 9,098,150 B2 | 8/2015 | Chapman et al. | | |
| 9,244,339 B2 | 1/2016 | Wang | | |
| 9,366,790 B2 | 6/2016 | Spurgeon et al. | | |
| 9,470,822 B2 | 10/2016 | Smith | | |
| 9,658,371 B2 | 5/2017 | Buoni | | |
| 9,703,023 B2 | 7/2017 | Smith et al. | | |
| 9,726,792 B2 | 8/2017 | Patel et al. | | |
| 2002/0141060 A1 * | 10/2002 | Lu | ........... | G02B 5/124 359/530 |
| 2003/0075815 A1 * | 4/2003 | Couzin | ........... | B29C 11/00605 264/1.34 |
| 2004/0196555 A1 * | 10/2004 | Mimura | ........... | G02B 5/124 359/530 |
| 2005/0141092 A1 * | 6/2005 | Couzin | ........... | G02B 5/122 359/529 |
| 2006/0181493 A1 * | 8/2006 | Satoh | ........... | G02B 5/124 345/84 |
| 2007/0071932 A1 | 3/2007 | Huang | | |
| 2007/0103781 A1 * | 5/2007 | Couzin | ........... | G02B 5/124 359/530 |
| 2007/0109641 A1 * | 5/2007 | Mimura | ........... | B29D 11/00605 359/530 |
| 2008/0068713 A1 * | 3/2008 | Smith | ........... | B29D 11/00605 359/530 |
| 2009/0295755 A1 * | 12/2009 | Chapman | ........... | G02B 5/124 345/175 |
| 2010/0265585 A1 * | 10/2010 | Kim | ........... | G02B 5/124 359/530 |
| 2011/0043915 A1 * | 2/2011 | Mimura | ........... | G02B 5/124 359/530 |
| 2011/0292326 A1 * | 12/2011 | Satoh | ........... | G02B 5/124 349/113 |

(56) References Cited

U.S. PATENT DOCUMENTS

| | | | |
|---|---|---|---|
| 2012/0081787 A1* | 4/2012 | Mimura | G02B 5/124 359/530 |
| 2012/0300306 A1 | 11/2012 | Nagahama et al. | |
| 2013/0135731 A1* | 5/2013 | Smith | G02B 5/124 359/529 |
| 2013/0342813 A1 | 12/2013 | Wang | |
| 2014/0058038 A1 | 2/2014 | Hunt et al. | |
| 2015/0278992 A1 | 10/2015 | Smits | |
| 2015/0369975 A1 | 12/2015 | Free et al. | |
| 2016/0011346 A1 | 1/2016 | Vasylyev | |
| 2016/0178815 A1 | 6/2016 | Wang | |
| 2016/0199729 A1 | 7/2016 | Wang | |
| 2016/0205388 A1 | 7/2016 | Wang | |
| 2016/0205392 A1 | 7/2016 | Wang | |
| 2017/0160590 A1 | 6/2017 | Kimme et al. | |
| 2017/0160631 A1 | 6/2017 | Wang | |

FOREIGN PATENT DOCUMENTS

| | | | |
|---|---|---|---|
| WO | 9915920 | 4/1999 | |
| WO | WO-2005066665 A1 * | 7/2005 | G02B 5/122 |
| WO | 2013188690 | 12/2013 | |
| WO | 2015187433 | 12/2015 | |
| WO | 2016069625 | 5/2016 | |
| WO | 2016199902 | 12/2016 | |
| WO | 2016199917 | 12/2016 | |
| WO | 2017079392 | 5/2017 | |
| WO | 2017116996 | 7/2017 | |

OTHER PUBLICATIONS

P. R. Yoder, "Study of Light Deviation Errors in Triple Mirrors and Tetrahedral Prisms," J. Opt. Soc. Am. 48, 496-499 (1958) (Year: 1958).*

Mark H. Bergen, Jacqueline Nichols, Christopher M. Collier, Xian Jin, Balakrishnan Raja, Deborah J. Roberts, Paul Ruchhoeft, Richard C. Willson, and Jonathan F. Holzman, "Retroreflective imaging system for optical labeling and detection of microorganisms," Appl. Opt. 53, 3647-3655 (2014) (Year: 2014).*

"International Search Report and Written Opinion" issued in PCT/US2018/048510, dated Jan. 25, 2019, 14 pages.

* cited by examiner

RETROREFLECTIVE SHEETING FOR PROJECTOR-BASED DISPLAY SYSTEM

CROSS-REFERENCES TO RELATED APPLICATIONS

This application claims the benefit of U.S. Provisional Application No. 62/551,288, filed Aug. 29, 2017, which is incorporated by reference in its entirety herein for all purposes.

FIELD

The present disclosure relates generally to prismatic retroreflective films that can be used, for example and without limitation, as projection screens.

BACKGROUND

Retroreflectors in the form of sheeting are often used in diverse applications including projector screens, traffic signs, and safety garments for road construction workers. In each of these cases, a purpose of the retroreflector is to increase or direct the visibility of reflected light. Retroreflective sheeting can comprise a layer of transparent plastic material having a substantially smooth front surface, and a rear surface provided with a plurality of retroreflective elements. Conventional retroreflectors use these elements to reflect an angular cone of light back towards the source. The angular spread of the cone is determined by the properties of the retroreflector. The returned light typically is brighter close to the source (at smaller observation angles), and falls off farther from the source (at larger observation angles).

An example of a retroreflector can be found in International Patent Application Publication No. WO 99/15920, which describes a reflective article having a structured surface which includes a plurality of reflective elements, each having a first, second, and third mutually reflecting face with definable dihedral angles. At least one of the dihedral angles differs from a right angle by more than two degrees. In one embodiment exactly one of the dihedral angles is so characterized and the remaining dihedral angles differ from a right angle by less than two degrees. In one embodiment the reflective elements are bounded by a plurality of groove sets in the structured surface, the groove sets having a preferred groove spacing between about 0.0004 and 0.002 inches (10-50 μm). Reflective elements having different sets of dihedral angles can be incorporated in the structured surface by tiling or by providing one or more sequences of grooves with differing groove side angle pairs. The article reflects an obliquely incident beam of light into two reflected beams on opposed sides of the incident beam. One of the two beams has a beam width sufficient to illuminate a predefined observation zone angularly displaced from the incident light direction.

The cube-corner retroreflective article of U.S. Pat. No. 4,775,219 includes three lateral reflecting faces formed by three intersecting sets of parallel V-shaped grooves, with at least one of the sets including, in a repeating pattern, at least two groove side angles that differ from one another. Thereby the array of cube-corner retroreflective elements is divided into repeating sub-arrays that each comprise a plurality of cube-corner retroreflective elements in a plurality of distinctive shapes that retroreflect incident light in distinctively shaped light patterns.

The display system of U.S. Patent Application Publication No. US 2017/0160631 comprises a retro-reflective screen having retro-reflective screen elements that reflect incident light. Each of the retro-reflective screen elements can include three intersecting planes. At least one of the three intersecting planes intersects an adjacent plane at an angle that is 90 degrees with an offset greater than 0 degrees. The display system can further include at least one projector that projects the light onto the retro-reflective screen, which light characterizes an image or video. The retroreflective screen having the retro-reflective screen elements can reflect the light at a cross-talk that is decreased by at least 10% and/or an intensity that is increased by at least 5%, as compared to a retro-reflective screen with retro-reflective screen elements having planes that each intersect an adjacent plane at an angle of 90° without the offset.

Even in view of these references, the need exists for retroreflective sheeting that can be used in a projector-based display for the focused direction of reflected images to multiple viewing positions located at different positions relative to the projector.

SUMMARY

In one embodiment, the disclosure is to a retroreflective article that comprises a retroreflective film and a plurality of retroreflective elements disposed on the back surface of the retroreflective film. Each of the retroreflective elements can be a non-equilateral triangular pyramid prism. The prisms can be bounded by three intersecting sets of substantially parallel and v-shaped grooves. Each groove side of the grooves forms a half angle, wherein at least one of the half angles preferably ranges from 43.5 degrees to 45 degrees, from 25 degrees to 30 degrees, or from 25 degrees to 28.5 degrees. The prisms can have three triangular faces and a triangular base with two sides that differ in length from one another. Preferably, the ratio of the length of the smaller of these two sides to the length of the larger of the two sides ranges from 80% to 92.5%. The prisms can have a third dihedral angle error with a magnitude that is greater than 1 degree, e.g., the third dihedral angle error can be less than −1 degree or greater than 1 degree. In certain aspects, each prism is canted edge-more-parallel at a cant angle greater than 0 degrees.

In another embodiment the disclosure relates to a display system. The display system comprises a retroreflective article in accordance with an embodiment, a projector, and a computer processor. The projector is configured to direct an incident light beam towards the retroreflective article. The retroreflective article is configured to reflect the incident light beam into a first and second reflected light beam that are offset from and on opposite sides of the incident light beam. The computer system can perform operations comprising controlling the projector to direct the incident light beam towards the retroreflective article.

In another embodiment the disclosure relates to a method of displaying an image. The method comprises providing a retroreflective article in accordance with an embodiment, and a projector. The method further comprises controlling the projector to direct an incident light beam towards the retroreflective article, thereby reflecting the incident light beam into a first and second reflected light beam offset from and on opposite sides of the incident light beam.

BRIEF DESCRIPTION OF DRAWINGS

The embodiments are described in detail below with reference to the appended drawings, wherein like numerals designate similar parts.

FIG. 9A is a plot of a viewing zone superimposed with the position of a light beam returned by a retroreflective article having a 6-degree offset, a 29.5-degree third groove half angle, and a diffusing film. The incident light enters the article head-on.

FIG. 10A is a plot of a viewing zone superimposed with the position of a light beam returned by a retroreflective article having a 6-degree offset, a 44.5-degree third groove half angle, and a diffusing film. The incident light enters the article head-on.

FIG. 11A is a plot of a viewing zone offset 0.3 m behind the projector superimposed with the position of a light beam returned by a retroreflective article having a 6-degree offset, a 29.5-degree third groove half angle, and a diffusing film. The incident light enters the article head-on.

DETAILED DESCRIPTION

Figure 1:
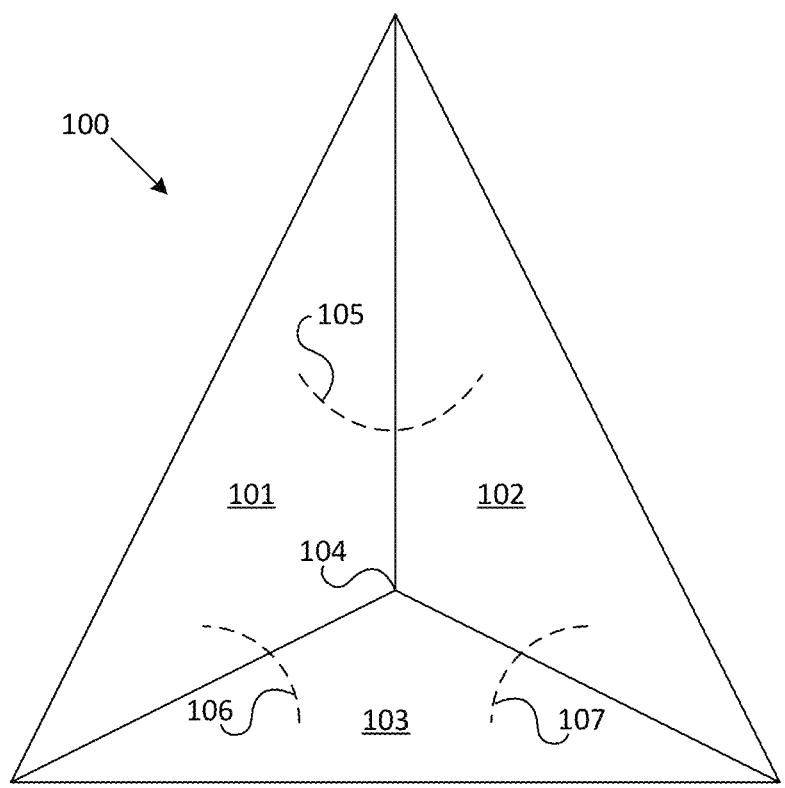
FIG. 1 is a top view of a retroreflective element of a retroreflective article in accordance with an embodiment.

The present disclosure generally relates to retroreflective screens that provide advantageous combinations of performance characteristics, for example, when the screens are employed in projector-based displays. For example, the inventors have determined that it is beneficial for a screen to reflect light back preferentially, or almost exclusively, to specific viewing regions located at different positions relative to a projector, e.g., above and below the projector, that is the source of the incident light being reflected. Existing projection screens, however, typically either scatter light in all directions or send light back somewhat preferentially in the general direction of the projector. Thus, with conventional retroreflective screens, it is often difficult to control the return of light to particular viewing regions in such a way that the reflected light: 1) can be easily observed from two different predetermined viewing regions, but 2) cannot be easily observed from outside of these regions.

The inventors have now discovered particular configurations of retroreflective elements that achieve both of these results. For example, the introduction of specific aberrations into the dihedral angles of cube corner retroreflective elements can beneficially cause light to deviate from perfect retroreflection. It has been discovered that by carefully controlling the configurations of the retroreflective elements arrayed on the screen, these deviations produce the desired reflection divergence patterns with two distinct viewing zones. These divergence patterns advantageously allow for applications in which the content viewed on the screen can depend strongly on the position of the viewer relative to the screen and the projector. For example, two viewers located above and below a projector could view the same content on the screen, while two other viewers at different locations above and below a different projector could view entirely different content on the same screen. In addition, the inventive retroreflective screens also allow for very bright images in the viewing regions, since light is not wasted by scattering in all directions. Other benefits of the retroreflective articles or screens include a transparent appearance to the film, and relative uniformity of brightness across the screen and within the multiple viewing regions. For example, certain configurations of the provided retroreflective screens can compensate for horizontal brightness instabilities typically associated with viewing positions offset towards or away from the screen.

In particular, it has been found that a retroreflective article comprising a retroreflective film and a plurality of specific retroreflective elements disposed, e.g., embossed, on the back surface of the retroreflective film can achieve the surprising results mentioned above. For example, the retroreflective elements can be configured to reflect an incident light beam such that the majority of reflected light is divided into a first reflected light beam and a second reflected light beam. The retroreflective article (or the components thereof) can be configured such that at least 30%, e.g., at least 40%, at least 50%, at least 60%, at least 70%, at least 75%, at least 80%, at least 85%, at least 90%, at least 92%, at least 94%, at least 96%, at least 97%, at least 98%, or at least 99% of the reflected light is divided into the first and second reflected light beams. The incident light beam can originate from a light source that emits light at least in the direction of the retroreflective article. In a preferred embodiment, the incident light beam originates from a projector having an optical axis that is directed towards the retroreflective article or screen.

The first and second reflected light beams reflected by the retroreflective article are directed to (at least) two different locations, e.g., on different (opposite) sides of the incident light beam. In a preferred embodiment, the incident light beam originates from a projector, the retroreflective article is oriented substantially vertically, and the first and second reflected light beams are directed to viewing regions or zones that are above and below the location of the projector. The first reflected light beam may be offset from the incident light beam by a first reflected light angle that is greater than 1 degree, e.g., greater than 2 degrees, greater than 3 degrees, greater than 4 degrees, greater than 5 degrees, greater than 6 degrees, greater than 7 degrees, greater than 8 degrees, greater than 9 degrees, greater than 10 degrees, greater than 12 degrees, greater than 14 degrees, greater than 16 degrees, greater than 18 degrees, greater than 20 degrees, greater than 25 degrees, greater than 30 degrees, greater than 35 degrees, greater than 40 degrees, or greater than 45 degrees. The first reflected light angle can range from 1 degree to 45 degrees, e.g., from 1 degree to 25 degrees, from 5 degrees to 30 degrees, from 10 degrees to 35 degrees, from 15 degrees to 40 degrees, or from 25 degrees to 40 degrees. The first reflected light angle can range from 1 degree to 10 degrees, e.g., from 1 degree to 6 degrees, from 2 degrees to 7 degrees, from 3 degrees to 8 degrees, from 4 degrees to 9 degrees, or from 5 degrees to 10 degrees.

The second reflected light beam can be offset from the incident light beam by a second reflected angle having a magnitude substantially identical to that of the first reflected angle, and a direction different from, e.g., opposite of, that of the first reflected light beam relative to the incident light beam. The limits and ranges discussed above for the first reflected angle are applicable to the second reflected angle. In one embodiment, the first reflected light angle is greater than 4 degrees above the incident light beam (at an offset angle of 4 degrees), and the second reflected light angle is greater than 4 degrees below the incident light beam (at an offset angle of −4 degrees). The first and second reflected light angles can be, for example, greater than 5 degrees, greater than 6 degrees, greater than 7 degrees, greater than 8 degrees, greater than 9 degrees, greater than 10 degrees, greater than 12 degrees, greater than 14 degrees, greater than 16 degrees, greater than 18 degrees, greater than 20 degrees, greater than 25 degrees, greater than 30 degrees, greater than 35 degrees, greater than 40 degrees, or greater than 45 degrees above and below the incident light beam, respectively. In this coordinate system, light returning directly to the light source would have $\alpha_x=0$ degrees and $\alpha_y=0$ degrees, wherein the term a is used to refer to the observation angle, i.e., the angle between the observed retroreflected beam and the incident light beam. The terms $\alpha_x$ and $\alpha_y$ refer to orthogonal components of the observation angle $\alpha$, wherein $\alpha_y$ lies in a vertical plane.

As used herein, the term "angle having a magnitude substantially identical" refers to a relationship between two angles wherein the absolute values of the angles are within 5 degrees of one another. For example, two angles have a magnitude substantially identical to one another if the absolute values of the angles are within 4 degrees, within 3 degrees, within 2 degrees, within 1 degree, within 0.9 degrees, within 0.8 degrees, within 0.7 degrees, within 0.6 degrees, within 0.5 degrees, within 0.4 degrees, within 0.3 degrees, within 0.2 degrees, or within 0.1 degrees of one another.

In some embodiments, the first reflected light beam has a brightness that is substantially identical to that of the second reflected light beam. This feature allows viewers positioned in the viewing zones or regions associated with each of the two viewing zones or regions to observe on the screen an image with substantially the same light intensity. As used herein, the term "brightness that is substantially identical" refers to a relationship between two brightness values wherein the first brightness value is within 20% of the second brightness value. For example, two brightness values are substantially identical if the first brightness value is within 18%, within 16%, within 14%, within 12%, within 10%, within 9%, within 8%, within 7%, within 6%, within 5%, within 4%, within 3%, within 2%, or within 1% of the second brightness value. In some embodiments, the first reflected light beam has a brightness that is not substantially identical to that of the second reflected light beam.

The retroreflective film has a front surface and a back surface that is opposite the front surface. The front surface can be substantially smooth. As used herein, the term "substantially smooth" refers to an outer surface that is completely or mostly free of texturing such as voids, protrusions, grooves, or ridges. A surface can have minor indentations or raised portions, or other imperfections not intended during manufacture, and still be considered to be substantially smooth. In a preferred embodiment, the front surface is substantially planar. It is appreciated, however, that the front surface can alternatively have a curved or otherwise nonplanar geometry for at least a portion of its shape.

The material of the retroreflective film can vary widely. For example the material of the retroreflective film can be a transparent plastic material, such as a polymer. The material can be selected from a wide variety of polymers, including, but not limited to, polycarbonates, polyesters, polystyrenes, polyarylates, styrene-acrylonitrile copolymers, urethane, acrylic acid esters, cellulose esters, ethylenically unsaturated nitrites, hard epoxy acrylates, acrylics and the like, with acrylic and polycarbonate polymers being preferred. In some embodiments, the retroreflective film comprises acrylic. In some embodiments, the retroreflective film comprises polycarbonate. In some embodiments, the retroreflective film comprises both acrylic and polycarbonate. In certain aspects, the retroreflective film includes a prism layer and a cap layer, wherein the prism layer comprises one of acrylic or polycarbonate, and wherein the cap layer comprises the other of acrylic or polycarbonate.

In a preferred embodiment, the retroreflective article further comprises a plurality of retroreflective elements disposed, e.g., embossed, on the back surface of the retroreflective film. It is appreciated, however, that the plurality of retroreflective elements can alternatively be disposed on the front surface of the retroreflective film, and the discussion relating to the retroreflective elements disposed on the back surface is applicable to retroreflective elements disposed on the front surface. The composition of the retroreflective elements can vary widely. For example the retroreflective elements can comprise metal, e.g., can be metallized. In a preferred embodiment, the retroreflective elements are air-backed. The use of air-backed retroreflective elements can give a semi-transparent or translucent character to the retroreflective film and the retroreflective article or screen.

In some embodiments, the retroreflective elements each have the shape of a non-equilateral triangular pyramid prism, e.g., an isosceles triangular pyramid prism, and each prism comprises multiple faces and a base. The triangular shape of each prism face and base can be non-equilateral, e.g., isosceles. Each of the prisms can be canted, and can have a triangular base that can be in the shape of an isosceles triangle. For an isosceles triangle-based pyramid prism, two of the three faces have substantially the same shape and size. Each triangular face and base comprises three sides. In some embodiments, two of the three triangular base sides differ in length such that the ratio of the length of the smaller side to the length of the larger side ranges from 80% to 92.5%, e.g., from 80% to 87.5%, from 81.25% to 88.75%, from 82.5% to 90%, from 83.75% to 91.25%, or from 85% to 92.5%. In some embodiments, the ratio of the smaller side length to the larger side length ranges from 83% to 90%, e.g., from 83% to 87.2%, from 83.7% to 87.9%, from 84.4% to 88.6%, from 85.1% to 89.3%, or from 85.8% to 90%. In terms of lower limits, the ratio of the length of the smaller side to the length of the larger side can be at least 80%, at least 81.25%, at least 82.5%, at least 83.75%, at least 85%, at least 86.25%, at least 87.5%, at least 88.75%, at least 90%, or at least 91.25%. In terms of upper limits, the ratio of the length of the smaller side to the length of the larger side can be less than 92.5%, less than 91.25%, less than 90%, less than 88.75%, less than 87.5%, less than 86.25%, less than 85%, less than 83.75%, less than 82.5%, or less than 81.25%.

FIG. 1 illustrates a top view of one of the plurality of non-equilateral triangular pyramid prisms. The prisms are each in the shape of a cube corner, and can also be referred to as cube corner prisms. The prism 100 has a first 101, second 102, and third 103 triangular face that intersect at an apex 104 configured to point away from the back surface of the retroreflective film. Three dihedral angles 105, 106, and 107 are formed between faces 101 and 102, between faces 101 and 103, and between faces 102 and 103, respectively. If the triangular pyramid prism has the shape of an orthogonal cube corner, then each of the dihedral angles is 90 degrees.

The term "dihedral angle error" as used herein refers to the difference between the actual dihedral angle and 90 degrees. Each non-equilateral triangular pyramid prism has three dihedral angle errors—first dihedral angle error ($e_1$), a second dihedral angle error ($e_2$), and a third dihedral angle error ($e_3$). The third dihedral angle error ($e_3$) is defined as the dihedral angle error between the two faces with similar, but mirrored (i.e., substantially congruent) shape. As used herein, the term "substantially congruent" refers to a relationship between different shapes wherein the lengths of analogous sides of the different shapes differ from one another by less than 20% (e.g., less than 18%, less than 16%, less than 14%, less than 12%, less than 10%, less than 8%, less than 6%, less than 4%, or less than 2%), and the analogous interior angles of the different shapes differ from one another by less than 20% (e.g., less than 18%, less than 16%, less than 14%, less than 12%, less than 10%, less than 8%, less than 6%, less than 4%, or less than 2%).

Figure 2:
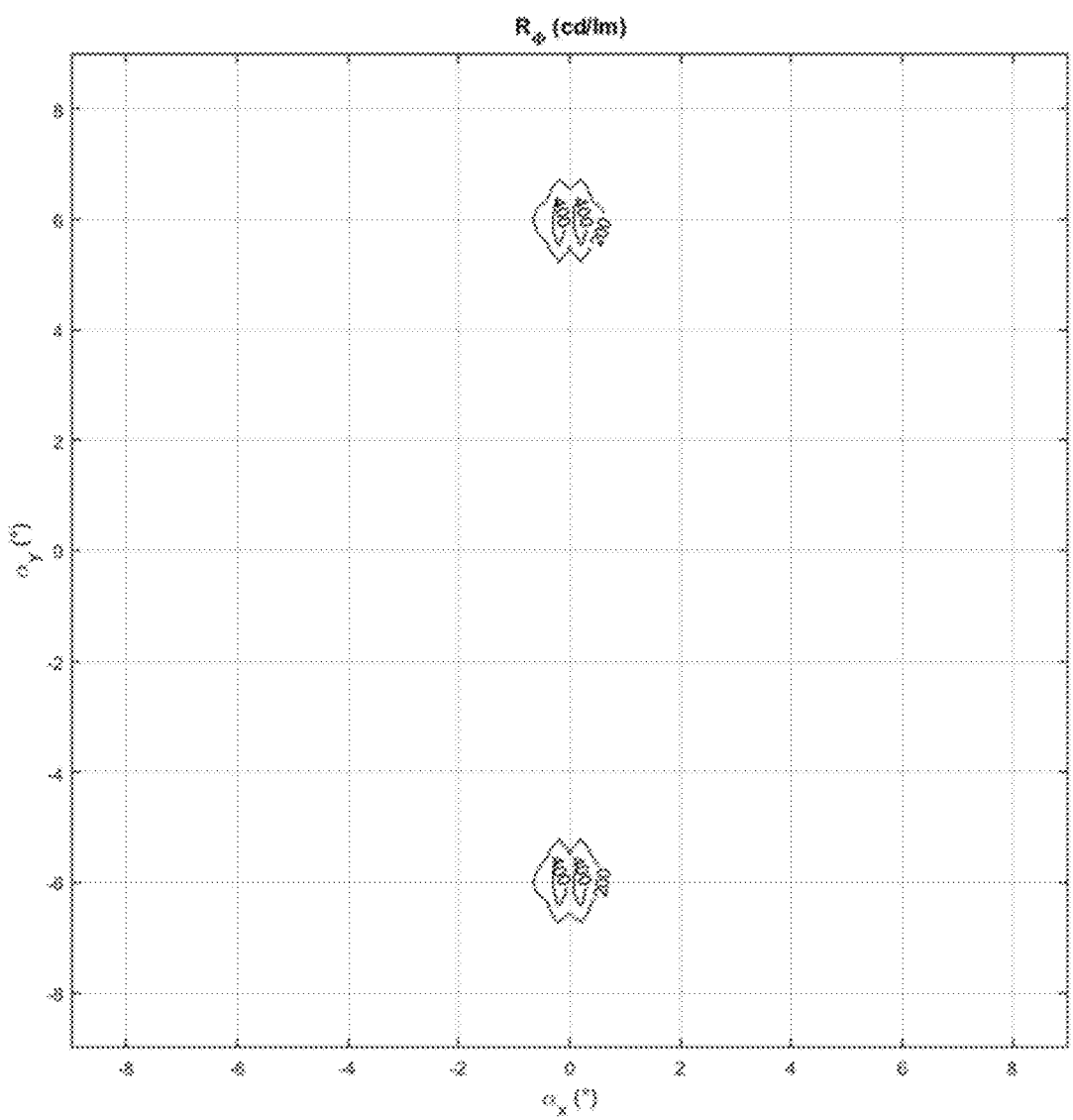
FIG. 2 is a plot of the positions of two narrow light beams returned by a retroreflective article in accordance with an embodiment.
Figure 3:
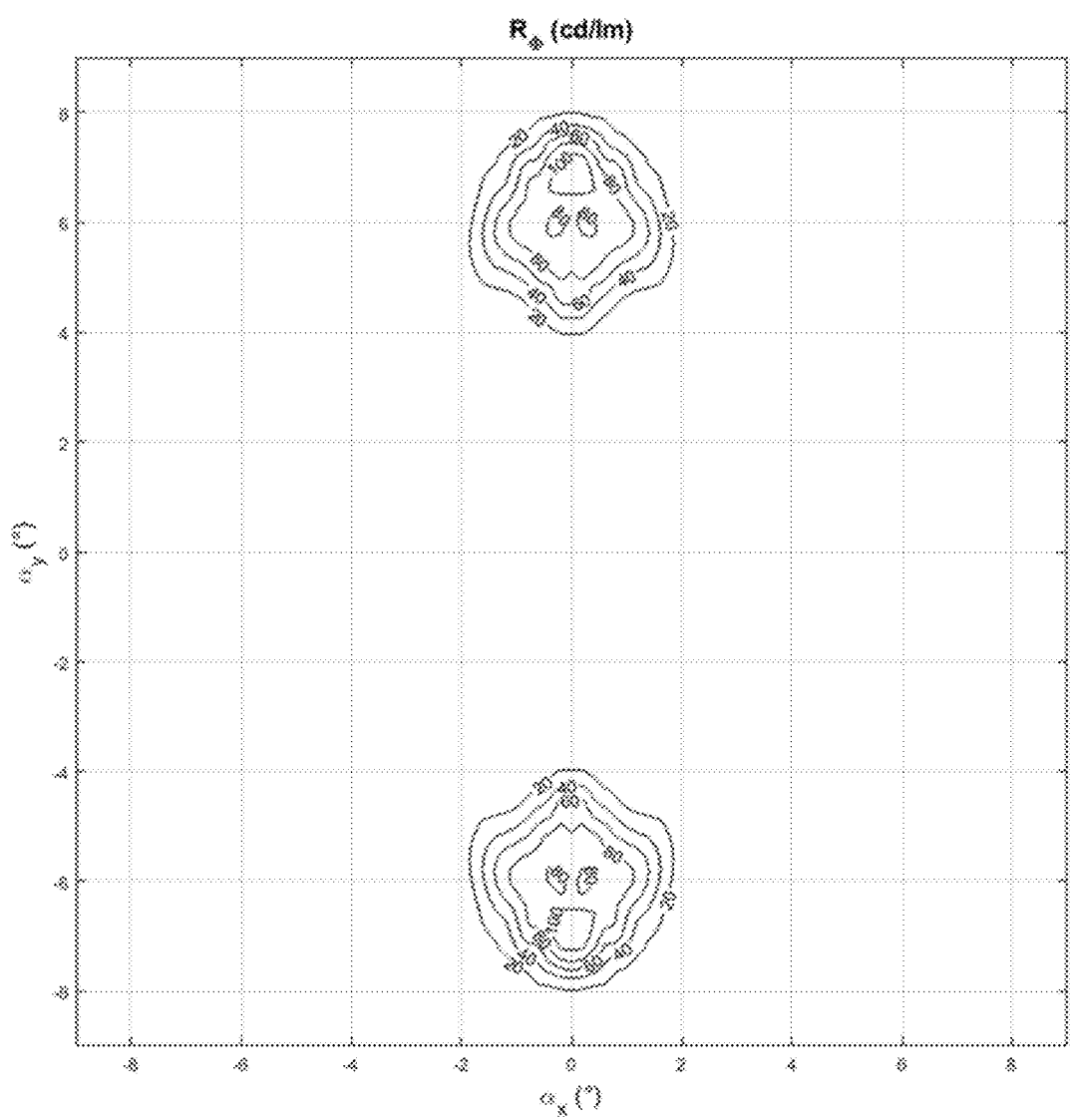
FIG. 3 is a plot of the positions of two broadened light beams returned by a retroreflective article having adjusted dihedral angles in accordance with an embodiment.

The inventors have found that the offset of the first and second reflected light beams relative to the incident light beam is a function of the prism dihedral angles, and that these reflected light beams can be controlled by aberrating the prism dihedral angles. If the base of the isosceles triangle is oriented vertically, then by configuring the dihedral angle between the two substantially congruent faces to differ significantly from the nominal value of 90 degrees (i.e., setting $e_3$ to differ significantly from zero), the returning beam can be divided into two narrow reflected beams, with one deviating upwards and the other downwards. FIG. 2 shows a graph of the positions of two such deviated beams retroreflected by an array of cube corner isosceles triangle prisms. In some cases, it is desirable that the reflected light beams are not as narrow as shown in FIG. 2, but are instead broadened as shown in FIG. 3. Such reflected beams can be achieved via control of the dihedral angles of the prisms, as discussed in more detail below.

As discussed above, each prism has three dihedral angles, with the third dihedral angle defined as the dihedral angle between the prism faces having mirrored similar shapes. In some embodiments, the average of the third dihedral angle errors of all prisms of the retroreflective element array is less than 0 degrees. The average of the third dihedral angle errors can range, for example and without limitation, from 0 degrees to −10 degrees, e.g., from 0 degrees to −6 degrees, from −1 degrees to −7 degrees, from −2 degrees to −8 degrees, from −3 degrees to −9 degrees, or from −4 degrees to −10 degrees. The average of the third dihedral angle errors can range from 0 degrees to −4 degrees, e.g., from 0 degrees to −2.4 degrees, from −0.4 degrees to −2.8 degrees, from −0.8 degrees to −3.2 degrees, from −1.2 degrees to −3.6 degrees, or from −1.6 degrees to −4 degrees. In terms of lower limits, the average of the third dihedral angle errors can be greater than −10 degrees, greater than −9 degrees, greater than −8 degrees, greater than −7 degrees, greater than −6 degrees, greater than −5 degrees, greater than −4 degrees, greater than −3 degrees, greater than −2 degrees, or greater than −1 degrees. In terms of upper limits, the average of the third dihedral angle errors can be less than −1 degree, less than −2 degrees, less than −3 degrees, less than −4 degrees, less than −5 degrees, less than −6 degrees, less than −7 degrees, less than −8 degrees, or less than −9 degrees. Large negative values of $e_3$ can be used to achieve the pattern of offset retroreflected light beams. A similar offset can be achieved with large positive values of $e_3$, but the use of negative values, as opposed to positive values, can give an efficiency boost to the cube corner prisms, as discussed in more detail below.

In some embodiments, the average of the first and/or second dihedral angle errors of all prisms of the retroreflective element array has a magnitude that is less than 0.5 degrees, e.g., less than 0.4 degrees, less than 0.3 degrees, less than 0.2 degrees, or less than 0.1 degrees. In some embodiments, the average of the first and/or second dihedral angle errors of all prisms of the retroreflective element array has a magnitude that is greater than 0.01 degrees, e.g., greater than 0.1 degrees, greater than 0.2 degrees, greater than 0.3 degrees, or greater than 0.4 degrees. The average of the first and/or second dihedral angle errors can, for example, range from 0 degrees to 0.3 degrees, from 0.05 degrees to 0.35 degrees, from 0.1 degrees to 0.4 degrees, from 0.15 degrees to 0.45 degrees, or from 0.2 degrees to 0.5 degrees.

In some embodiments, the magnitude of each dihedral angle error of each prism of the retroreflective element array ranges from 0.01 degrees to 10 degrees. The magnitude of each dihedral angle error can range, for example and without limitation, from 0.01 degrees to 6 degrees, from 1 degrees to 7 degrees, from 2 degrees to 8 degrees, from 3 degrees to 9 degrees, or from 4 degrees to 10 degrees. The magnitude of each dihedral angle error can range from 0.01 degrees to 4 degrees, e.g., from 0.01 degrees to 2.4 degrees, from 0.4 degrees to 2.8 degrees, from 0.8 degrees to 3.2 degrees, from 1.2 degrees to 3.6 degrees, or from 1.6 degrees to 4 degrees. In terms of upper limits, the magnitude of each dihedral angle error can be less than 10 degrees, e.g., less than 9 degrees, less than 8 degrees, less than 7 degrees, less than 6 degrees, less than 5 degrees, less than 4 degrees, less than 3 degrees, less than 2 degrees, or less than 1 degrees. In terms of lower limits, the magnitude of each dihedral angle error can be greater than 0.01 degrees, e.g., greater than 1 degree, greater than 2 degrees, greater than 3 degrees, greater than 4 degrees, greater than 5 degrees, greater than 6 degrees, greater than 7 degrees, greater than 8 degrees, or greater than 9 degrees.

Alternatively or additionally, broadening the reflected light beams can be accomplished with the use of a diffusing film. A diffusing film can be located, for example, directly adjacent to the front surface of the retroreflective film. In some embodiments, an adhesive layer is employed to adhere the diffusing film to the front surface. In these cases, the adhesive layer can be directly adjacent to the front surface of the retroreflective film, and the diffusing film can be directly adjacent to the adhesive layer, e.g., the adhesive layer can be sandwiched between the diffusing film and the retroreflective film. In some embodiments, one or more other films or layers are positioned between the diffusing film and the front surface of the retroreflective film. In some embodiments, the diffusing film is itself a component layer of the retroreflective film, and is located between the front and back surfaces of the retroreflective layer.

The diffusing film can comprise light-diffusing particles dispersed in a matrix material, wherein the light-diffusing particles have a refractive index that is different from the refractive index of the matrix. The light-diffusing particles can vary in color, e.g., can be white or black, or substantially white or substantially black, with other colors being contemplated as well. The light-diffusing particles can be transparent, or substantially so. The light-diffusing particles can comprise particles selected from the group consisting of white particles or particles that are substantially white, black particles or particles that are substantially black, transparent particles or particles that are substantially transparent, and combinations thereof. For high refractive index applications, e.g., those having indices of refraction values of 1.6 to 2.8, the light-diffusing particles can comprise titanium oxide ($TiO_2$), silicon dioxide ($SiO_2$), calcium carbonate ($CaCO_3$), barium sulfate ($BaSO_4$), or combinations thereof. In embodiments where the light-diffusing particles have a smaller indices of refraction, e.g., those having index of refraction values of 1.0 to 1.5, the light-diffusing particles can include a material comprising an organic or inorganic compound such as, for example, silicone resin, polytetrafluoroethylene (PTFE), roughened quartz, flashed opal, or combinations thereof. The light-diffusing particles can include hollow structures or hollow particles such as hollow glass beads or hollow resin beads, or hollow structures made from other materials.

In certain aspects, the diffusing film is a structured diffuser, e.g., a diffuser comprising a patterned surface. In some embodiments, the patterned surface of the diffuser is a holographically generated relief pattern. The structured or patterned surface can be on the inner face of the diffuser, e.g., the diffuser surface facing the retroreflective film, or on the outer face of the diffuser, e.g., the diffuser surface facing opposite the retroreflective film. The surface relief pattern of the diffuser can be anisotropic, such that the pattern is elliptical. Such an anisotropic surface relief pattern can be used to broaden the reflected light beams by differing degrees in different directions. In some embodiments, the diffusing film comprises an anisotropic surface relief pattern configured to reflect light with a greater angle of diffusion in the horizontal x direction than in the vertical y direction. In some embodiments, the diffusing film comprises an anisotropic surface relief pattern configured to reflect light with a greater angle of diffusion in the vertical y direction than in the horizontal y direction.

The diffusing film can have a full-width half-maximum angle of diffusion in a vertical y direction that is less than 2 degrees, e.g., less than 1.8 degrees, less than 1.6 degrees, less than 1.4 degrees, less than 1.2 degrees, less than 1 degree, less than 0.9 degrees, less than 0.8 degrees, less than 0.7 degrees, less than 0.6 degrees, or less than 0.5 degrees. The full-width half-maximum angle of diffusion in the y direction can, for example, range from 0 degrees to 2 degrees, e.g., from 0 degrees to 1.2 degrees, from 0.2 degrees to 1.4 degrees, from 0.4 degrees to 1.6 degrees, from 0.6 degrees to 1.8 degrees, or from 0.8 degrees to 2 degrees. The use of such a smaller vertical diffusion angle can limit the vertical spread of the light. This can be useful, for example, when it is desirable to return light for viewing at just one height. The diffusing film can have a full-width half-maximum angle of diffusion in a horizontal x direction that is greater than 1.5 degrees, e.g., greater than 1.8 degrees, greater than 2.1 degrees, greater than 2.4 degrees, greater than 2.7 degrees, greater than 3 degrees, greater than 3.5 degrees, greater than 4 degrees, greater than 4.5 degrees, or greater than 5 degrees. The full-width half-maximum angle of diffusion in the x direction can, for example, range from 0 degrees to 5 degrees, e.g., from 0 degrees to 3 degrees, from 0.5 degrees to 3.5 degrees, from 1 degrees to 4 degrees, from 1.5 degrees to 4.5 degrees, or from 2 degrees to 5 degrees. The use of such a larger horizontal diffusion angle can allow for multiple horizontal viewing positions. This can be useful, for example, when accommodating multiple side-by-side viewers. In some embodiments, the diffusing film has a full-width half-maximum angle of diffusion in a vertical y direction that is less than 1 degree, and a full-width half-maximum angle of diffusion in a horizontal x direction that is greater than 3 degrees.

The diffusing film can have a full-width half-maximum angle of diffusion in a horizontal x direction that is less than 2 degrees, e.g., less than 1.8 degrees, less than 1.6 degrees, less than 1.4 degrees, less than 1.2 degrees, less than 1 degree, less than 0.9 degrees, less than 0.8 degrees, less than 0.7 degrees, less than 0.6 degrees, or less than 0.5 degrees. The full-width half-maximum angle of diffusion in the x direction can, for example, range from 0 degrees to 2 degrees, e.g., from 0 degrees to 1.2 degrees, from 0.2 degrees to 1.4 degrees, from 0.4 degrees to 1.6 degrees, from 0.6 degrees to 1.8 degrees, or from 0.8 degrees to 2 degrees. The use of such a smaller horizontal diffusion angle can limit the horizontal spread of the light. This can be useful, for example, when it is desirable to return light for viewing by just one person. The diffusing film can have a full-width half-maximum angle of diffusion in a vertical y direction that is greater than 1.5 degrees, e.g., greater than 1.8 degrees, greater than 2.1 degrees, greater than 2.4 degrees, greater than 2.7 degrees, greater than 3 degrees, greater than 3.5 degrees, greater than 4 degrees, greater than 4.5 degrees, or greater than 5 degrees. The full-width half-maximum angle of diffusion in the y direction can, for example, range from 0 degrees to 5 degrees, e.g., from 0 degrees to 3 degrees, from 0.5 degrees to 3.5 degrees, from 1 degrees to 4 degrees, from 1.5 degrees to 4.5 degrees, or from 2 degrees to 5 degrees. The use of such a larger vertical diffusion angle can allow for multiple vertical viewing positions. This can be useful, for example, when accommodating viewers with differing heights. In some embodiments, the diffusing film has a full-width half-maximum angle of diffusion in a horizontal x direction that is less than 1 degree, and a full-width half-maximum angle of diffusion in a vertical y direction that is greater than 3 degrees.

Figure 4:
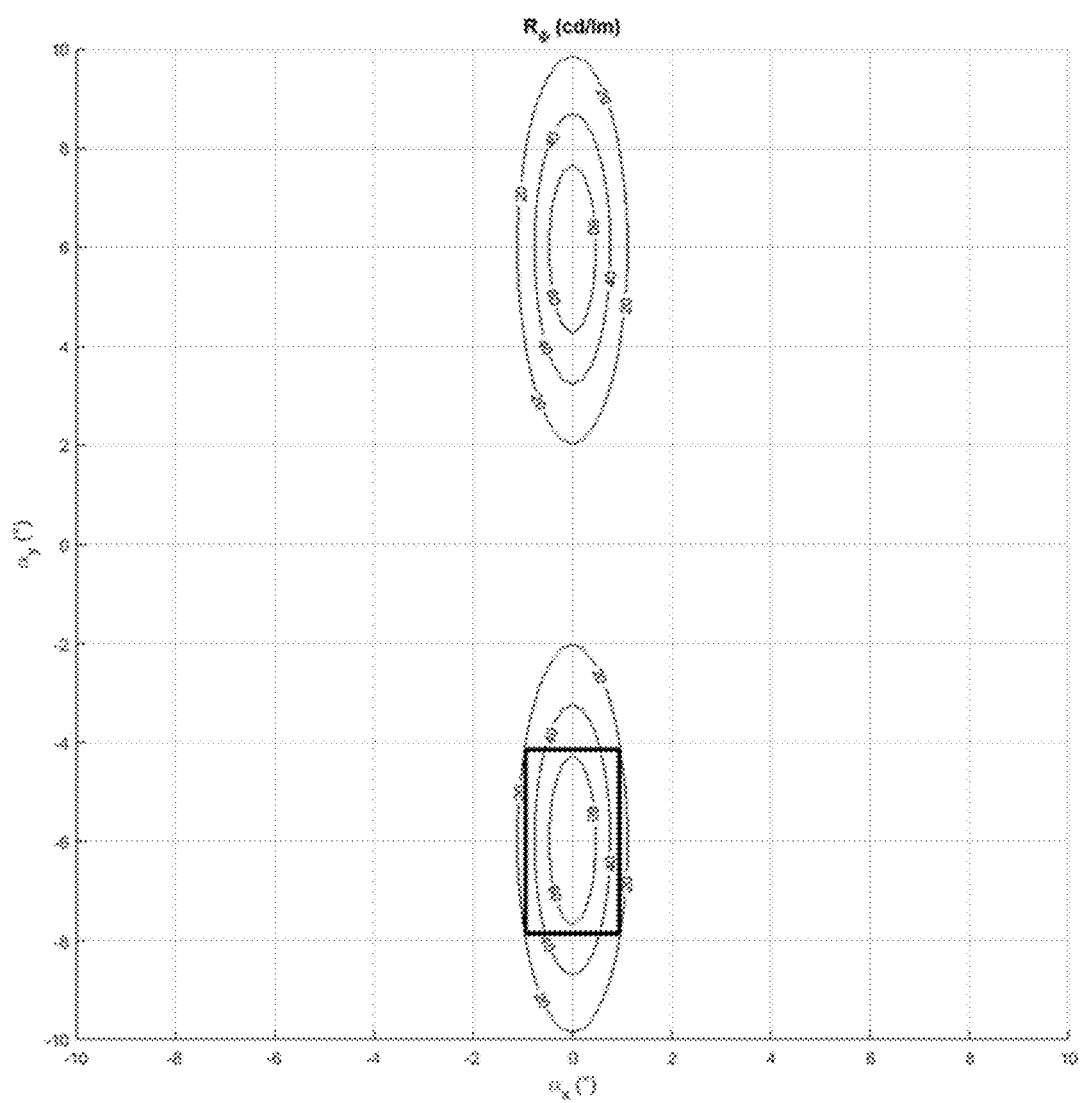
FIG. 4 is a plot of the positions of two vertically spread light beams returned by a retroreflective article having a diffusing film in accordance with an embodiment.

FIG. 4 shows a graph of the positions of two deviated reflected light beams retroreflected by an article having a diffusion film with a full-width half-maximum angle of diffusion in a horizontal x direction of 0.8 degrees ($FWHM_x=0.8$ degrees) and a full-width half-maximum angle of diffusion in a vertical y direction of 3.75 degrees ($FWHM_y=3.75$ degrees). This configuration beneficially spreads the light in the vertical direction which can be useful for situations in which it is desirable to limit the horizontal spread of the light, e.g. light sent back for viewing by just one person, but allows for multiple vertical viewing positions, e.g. accommodating viewers with differing heights. The superimposed rectangular region shown in FIG. 4 represents a desired viewing region which is serviced by the combination of retroreflective film and diffusing film.

In some cases, the use of a diffusing film as a beam broadening technique can be combined with the aforementioned modification of dihedral angle errors to produce an optimal profile for a given application. Alternatively, each technique can be employed separately.

The dihedral angle technique can be advantageous, for example, if it is desired for the transitions from bright to dark to be fairly abrupt. This technique can, though, require tooling for each new design in a process that can be costly and time-consuming.

The diffusing film technique can be advantageous, for example, if it is desired to hide seams in the prismatic film. Different diffusing films can also be matched with different prismatic films to accommodate the needs of various applications with increased flexibility. This technique can, though, add cost to the display screen, and produce light intensity or brightness transitions that are less abrupt.

As described above, the adjustment of the dihedral angles of the cube corner prism retroreflective elements can also influence the shapes of the reflected light beams returned by the retroreflective article. Through the selection of particular dihedral angle combinations, the size of the viewing regions or patches can be increased as desired, while maintaining sufficient uniformity of illumination within each patch and among the two patches. In some of these embodiments, the retroreflective film is used in conjunction with a diffusing film, which can help to reduce the visibility of seam lines and to improve in screen uniformity. This use of the diffusing film and the control of the dihedral angles also can increase the size of the patch and help with uniformity within the patch. Accordingly, the design of the prisms can be configured to provide for a smaller patch if used with a stronger diffuser, or a larger patch if used with a weaker diffuser or no diffuser. Likewise, if the retroreflective film design provides a larger patch, a weaker diffuser or no diffuser can be selected. Alternatively, if the retroreflective film provides a smaller patch, a stronger diffuser can be selected. The width and height of the patches can be controlled independently, either by using anisotropic diffusers, or by varying the dihedral angle pattern to affect the aspect ratio of the patch. Combinations of these approaches can provide more flexibility.

The configurations of the retroreflective elements disposed on the back surface of the retroreflective film can be determined by geometries of sets of substantially parallel grooves in the back surface, wherein the sets determine the positioning of the retroreflective elements. The configurations and arrangements of these groove sets can therefore determine the cube cant, prism depth, and/or dihedral angle errors of prism retroreflective elements. As used herein, the term "substantially parallel grooves" refers to grooves that are substantially parallel to one another, e.g. parallel to one another. Each of the grooves has a groove axis extending along the length of the groove, wherein the angle between the groove axes of two substantially parallel grooves has a magnitude less than 5 degrees, e.g., less than 4 degrees, less than 3 degrees, less than 2 degrees, or less than 1 degree. The respective grooves may differ from one another in slope by a magnitude less than 5 degrees, e.g., less than 4 degrees, less than 3 degrees, less than 2 degrees, or less than 1 degree, when compared to the slope of a basis line.

Figure 5A:
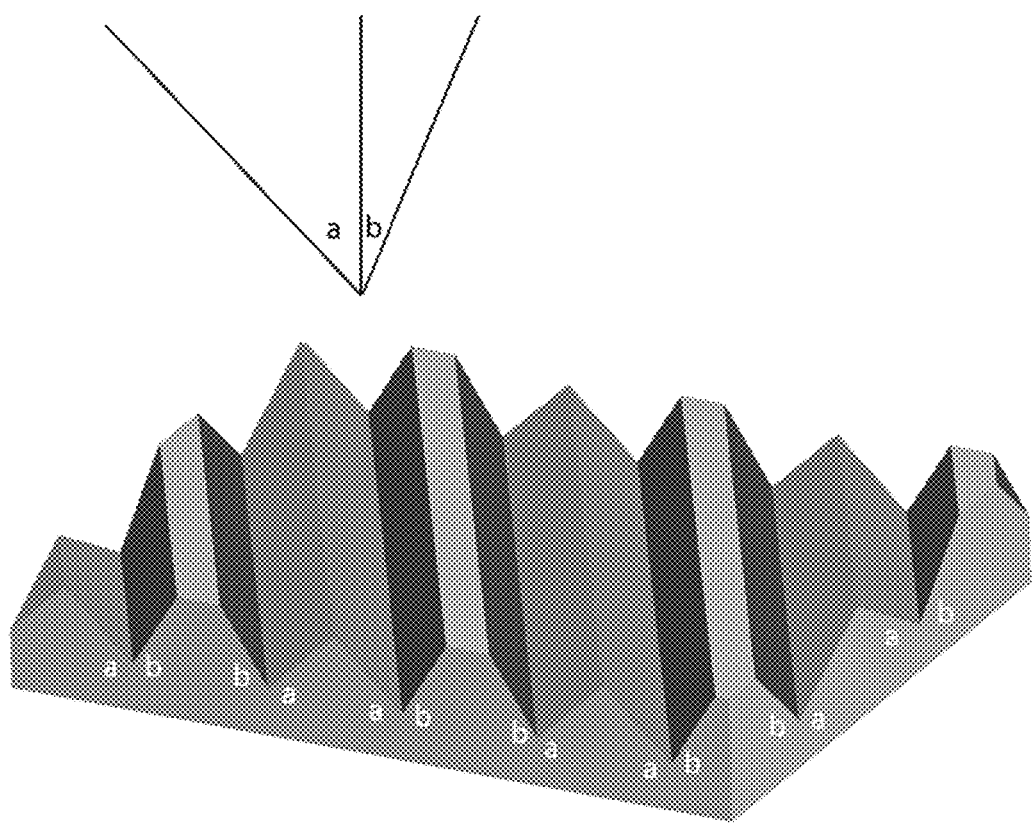
FIG. 5A is an illustration of the cutting of the first grooves in the surface of a substrate in accordance with an embodiment.

Illustrative examples of the groove sets are shown in FIGS. 5A-5D, which provide an overview of a cutting process used to produce the retroreflective elements. In FIG. 5A, a first set of substantially parallel grooves is shown cut into a substrate of which a replica or a cast can be used to emboss the retroreflective film back surface. The grooves can be cut using a cutting tool having a pointed tip. In some embodiments, the cutting tool tip also includes a flat region, such that a flat region is created in the substrate between adjacent retroreflective elements. The presence of such flat regions can boost transparency, but at the cost of efficiency. Each groove is cut along a groove axis, and typically has a v shape with two intersecting groove sides. The grooves of this first set have half angles "a" and "b" that are defined by corresponding "a" and "b" angles on the surface of the shown cutting tool. The half angles are formed between the groove sides and a plane parallel to the groove axis and perpendicular to the plane of the substrate or the back surface of the retroreflective film. The sizes and tilts of the cutting tool, grooves, and retroreflective elements have been exaggerated in this and the following figures for clarity. In some embodiments, each groove of the first set is separated from the adjacent groove of the set by a substantially identical spacing, e.g., a first spacing. The first spacing can, for example, range from 0.03 mm to 0.27 mm, e.g., from 0.03 mm to 0.15 mm, from 0.06 mm to 0.18 mm, from 0.09 mm to 0.21 mm, from 0.12 mm to 0.24 mm, or from 0.15 mm to 0.27 mm. The first spacing can range from 0.1 mm to 0.2 mm, e.g., from 0.1 to 0.16 mm, from 0.11 mm to 0.17 mm, from 0.12 mm to 0.18 mm, from 0.13 mm to 0.19 mm, or from 0.14 mm to 0.2 mm. In terms of upper limits, the first spacing can be greater than 0.03 mm, e.g., greater than 0.06 mm, greater than 0.09 mm, greater than 0.12 mm, greater than 0.15 mm, greater than 0.18 mm, greater than 0.21 mm, or greater than 0.24 mm. In terms of lower limits, the first spacing can be less than 0.27 mm, e.g., less than 0.24 mm, less than 0.21 mm, less than 0.18 mm, less than 0.15 mm, less than 0.12 mm, less than 0.09 mm, or less than 0.06 mm.

Figure 5B:
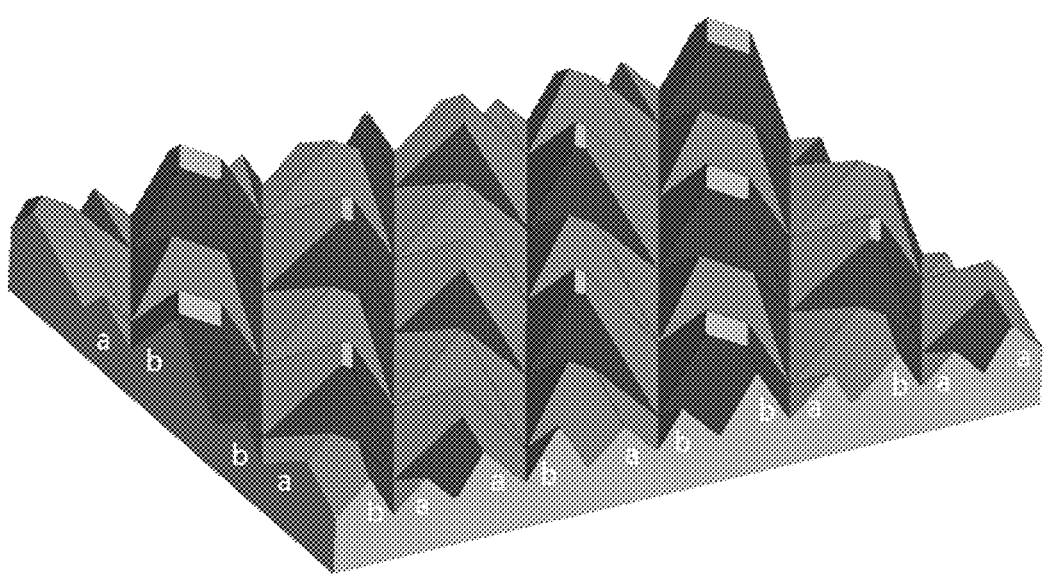
FIG. 5B is an illustration of the cutting of the second grooves in the surface of a substrate in accordance with an embodiment.

In FIG. 5B, a second set of substantially parallel grooves is shown cut into the substrate along with the first groove set. Similarly to the first set grooves, the grooves of this second set can have half angles "a" and "b" that are defined by corresponding "a" and "b" angles on the surface of the same cutting tool used to produce the first set grooves. In some embodiments, each groove of the second set is separated from the adjacent groove of the set by a substantially identical spacing (i.e., a second spacing). The second spacing can be, for example, range from 0.03 mm to 0.27 mm, e.g., from 0.03 mm to 0.15 mm, from 0.06 mm to 0.18 mm, from 0.09 mm to 0.21 mm, from 0.12 mm to 0.24 mm, or from 0.15 mm to 0.27 mm. The second spacing can range from 0.1 mm to 0.2 mm, e.g., from 0.1 to 0.16 mm, from 0.11 mm to 0.17 mm, from 0.12 mm to 0.18 mm, from 0.13 mm to 0.19 mm, or from 0.14 mm to 0.2 mm. In terms of upper limits, the second spacing can be greater than 0.03 mm, greater than 0.06 mm, greater than 0.09 mm, greater than 0.12 mm, greater than 0.15 mm, greater than 0.18 mm, greater than 0.21 mm, or greater than 0.24 mm. In terms of lower limits, the second spacing can be less than 0.27 mm, less than 0.24 mm, less than 0.21 mm, less than 0.18 mm, less than 0.15 mm, less than 0.12 mm, less than 0.09 mm, or less than 0.06 mm.

In some embodiments, and as shown in FIGS. 5A-5D, the grooves of the first set have a spacing substantially identical to that of the grooves of the second set. As used herein, the term "spacing substantially identical" refers to a relationship between two spacings wherein the spacings are within 20% of one another. For example, two spacings have a spacing substantially identical to one another if the spacings are within 18%, within 16%, within 14%, within 12%, within 10%, within 9%, within 8%, within 7%, within 6%, within 5%, within 4%, within 3%, within 2%, or within 1% of one another.

Figure 5C:
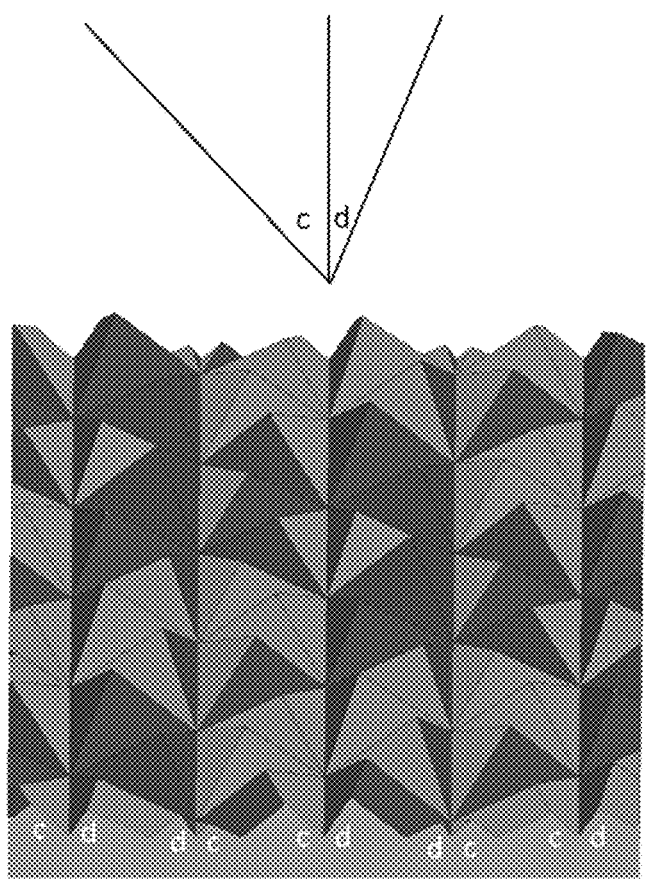
FIG. 5C is an illustration of the cutting of the third grooves in the surface of a substrate in accordance with an embodiment.

In FIG. 5C, a third set of substantially parallel grooves is shown cut into the substrate along with the first and second groove sets. The grooves of this third set have half angles "c" and "d" that are defined by corresponding "c" and "d" angles on the surface of the shown cutting tool. In some embodiments, each groove of the third set is separated from the adjacent groove of the set by a substantially identical spacing (i.e., a third spacing). The third spacing can be, for example, range from 0.03 mm to 0.27 mm, e.g., from 0.03 mm to 0.15 mm, from 0.06 mm to 0.18 mm, from 0.09 mm to 0.21 mm, from 0.12 mm to 0.24 mm, or from 0.15 mm to 0.27 mm. The third spacing can range from 0.1 mm to 0.2 mm, e.g., from 0.1 to 0.16 mm, from 0.11 mm to 0.17 mm, from 0.12 mm to 0.18 mm, from 0.13 mm to 0.19 mm, or from 0.14 mm to 0.2 mm. In terms of upper limits, the third spacing can be greater than 0.03 mm, greater than 0.06 mm, greater than 0.09 mm, greater than 0.12 mm, greater than 0.15 mm, greater than 0.18 mm, greater than 0.21 mm, or greater than 0.24 mm. In terms of lower limits, the third spacing can be less than 0.27 mm, less than 0.24 mm, less than 0.21 mm, less than 0.18 mm, less than 0.15 mm, less than 0.12 mm, less than 0.09 mm, or less than 0.06 mm. In some embodiments, the grooves of the third set have a spacing smaller than the first and second spacing. In some embodiments, the grooves of the third set have a spacing larger than the first and second spacing.

Figure 5D:
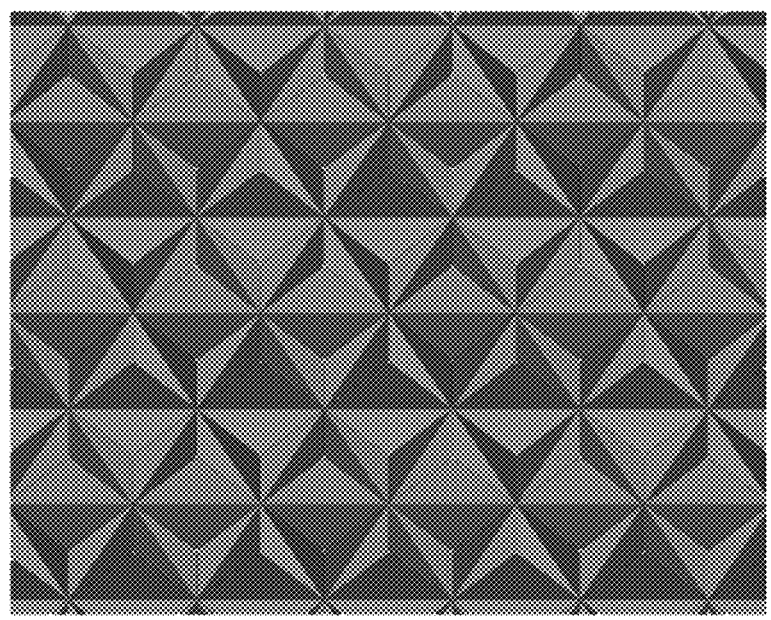
FIG. 5D is a plan view of an array of cube corner prisms bounded by the first, second, and third grooves in the surface of a substrate or the back surface of a retroreflective film in accordance with an embodiment.

FIG. 5D is a plan view of an array of cube corner prisms bounded by the first, second, and third grooves in the back surface of a retroreflective film in accordance with an embodiment. The illustration shows the array of cube corner prisms bounded by the three sets of substantially parallel grooves. The particular geometry of an individual cube corner element of the array will depend on the particular half grooves of the element border. For example, a cube corner element can be bounded by an "a" half groove from a first set groove, an "a" half groove from a second set groove, and a "c" half groove from a third set groove. In this case, the cube corner can be considered an "aac" element. Similarly, with the grooves as shown in FIGS. 5A-5D, cube corners can alternatively be "aad", "abc", "abd", "bac", "bad", "bbd", or "bbc" elements.

In some embodiments, one or both of the half angles of the third grooves ranges from 25 degrees to 28.5 degrees, e.g., from 25 degrees to 26.9 degrees, from 25.4 degrees to 27.3 degrees, from 25.8 degrees to 27.7 degrees, from 26.2 degrees to 28.1 degrees, or from 26.6 degrees to 28.5 degrees. One or both of the third groove half angles can range from 43.5 degrees to 45 degrees, e.g., from 43.5 degrees to 44.2 degrees, from 43.7 degrees to 44.4 degrees, from 43.9 degrees to 44.6 degrees, from 44.1 degrees to 44.8 degrees, or 44.3 degrees to 45 degrees. In terms of lower limits, one or both of the third groove half angles can be greater than 25 degrees, e.g., greater than 25.4 degrees, greater than 25.8 degrees, greater than 26.2 degrees, greater than 26.6 degrees, greater than 26.9 degrees, greater than 27.3 degrees, greater than 27.7 degrees, greater than 28.1 degrees, greater than 43.5 degrees, greater than 43.7 degrees, greater than 43.9 degrees, greater than 44.1 degrees, greater than 44.3 degrees, greater than 44.4 degrees, greater than 44.6 degrees, or greater than 44.8 degrees. In terms of upper limits, one or both of the third groove half angles can be less than 45 degrees, e.g., less than 44.8 degrees, less than 44.6 degrees, less than 44.4 degrees, less than 44.2 degrees, less than 44.1 degrees, less than 43.9 degrees, less than 43.7 degrees, less than 28.5 degrees, less than 28.1 degrees, less than 27.7 degrees, less than 27.3 degrees, less than 26.9 degrees, less than 26.6 degrees, less than 26.2 degrees, less than 25.8 degrees, or less than 25.4 degrees.

The depth of the grooves gives each of the cube corner prisms of the array a cube corner depth. The cube corner depth is defined as the distance between the maximum height of the cube corner prism and the base of the cube corner prism. The cube corner depth can, for example, range from 1 mil to 5 mils, e.g., from 1 mil to 3.4 mils, from 1.4 mils to 3.8 mils, from 1.8 mils to 4.2 mils, from 2.2 mils to 4.6 mils, or from 2.6 mils to 5 mils. The cube corner depth can range from 2.2 mils to 3.8 mils, e.g., from 2.2 mils to 3 mils, from 2.4 mils to 3.2 mils, from 2.6 mils to 3.4 mils, from 2.8 mils to 3.6 mils, or from 3 mils to 3.8 mils. In terms of lower limits, the cube corner depth can be greater than 1 mil, e.g., greater than 1.4 mils, greater than 1.8 mils, greater than 2.2 mils, greater than 2.6 mils, greater than 3 mils, greater than 3.4 mils, greater than 3.8 mils, greater than 4.2 mils, or greater than 4.6 mils. In terms of upper limits, the cube corner depth can be less than 5 mils, e.g., less than 4.6 mils, less than 4.2 mils, less than 3.8 mils, less than 3.4 mils, less than 3 mils, less than 2.6 mils, less than 2.2 mils, less than 1.8 mils, or less than 1.4 mils.

Figure 6:
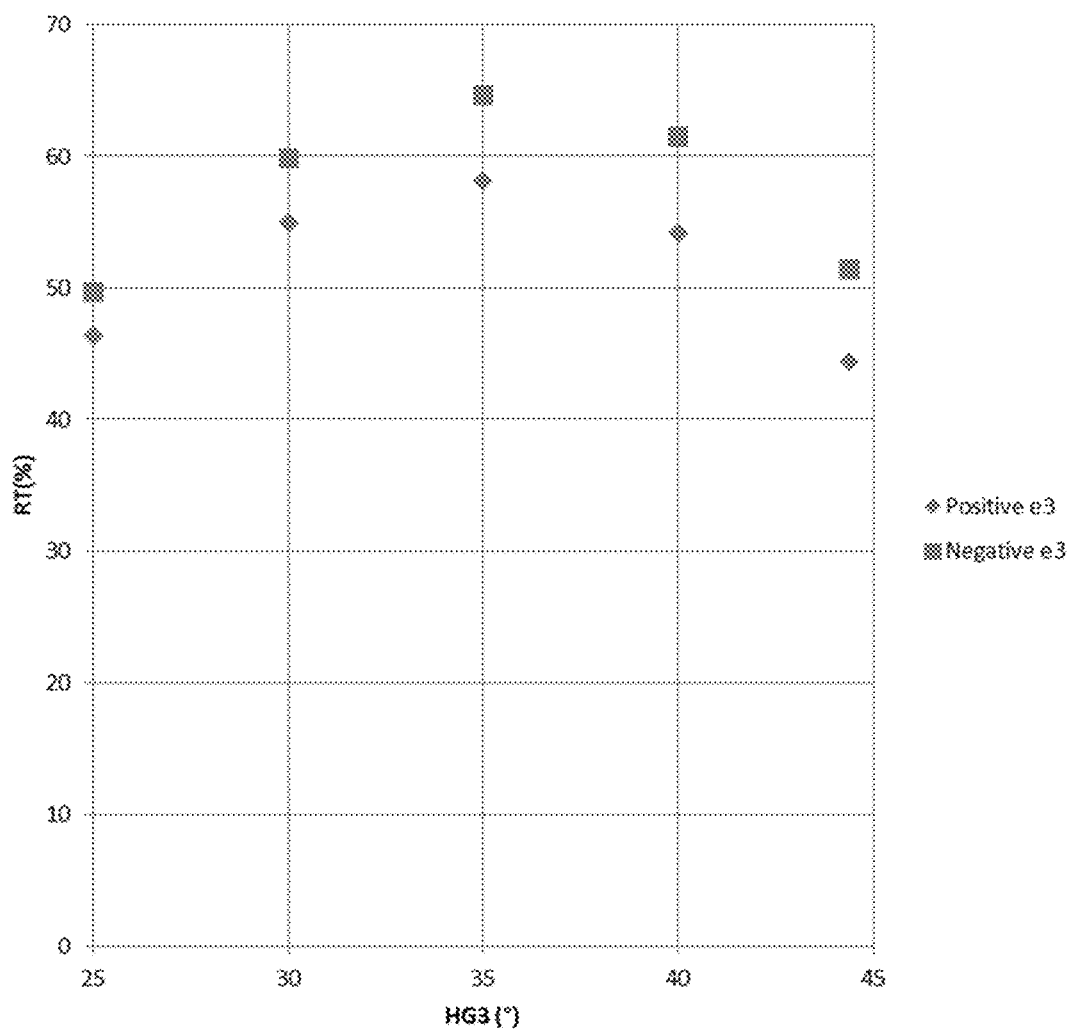
FIG. 6 is a plot of retroreflective efficiency versus third groove half angle for a retroreflective article having positive or negative major dihedral angle aberrations.

In this discussion, we define cant as the cant of the unaberrated cube having the same cube shape, and we also consider the third groove half angle ($HG_3$). This angle has functional relevance for transparency effects, and also for the horizontal entrance angularity. As is shown in the graph of FIG. 6, for the case of a 6-degree offset with normal incidence of light, prism designs that use a negative value of $e_3$ are always more efficient in returning light, with a value of $HG_3$ of approximately 35 degrees giving the highest efficiency.

In some embodiments, the cube corner prisms of the retroreflective article are canted face-more-parallel, e.g., at a cant ranging from −3 degrees to −10 degrees. The cube corner prisms can have a cant ranging from −3 degrees to −8 degrees, from −3.5 degrees to −8.5 degrees, from −4 degrees to −9 degrees, from −4.5 degrees to −9.5 degrees, or from −5 degrees to −10 degrees. The cant can range from −5 degrees to −8 degrees, e.g., from −5 degrees to −6.8 degrees, from −5.3 degrees to −7.1 degrees, from −5.6 degrees to −7.4 degrees, from −5.9 degrees to −7.7 degrees, or from −6.2 degrees to −8 degrees. In terms of lower limits, the cant can be greater than −10 degrees, e.g., greater than −9.5 degrees, greater than −9 degrees, greater than −8.5 degrees, greater than −8 degrees, greater than −7.5 degrees, greater than −7 degrees, greater than −6.5 degrees, greater than −6 degrees, greater than −5.5 degrees, greater than −5 degrees, greater than −4.5 degrees, greater than −4 degrees, or greater than −3.5 degrees. In terms of upper limits, the cant can be less than −3 degrees, e.g., less than −3.5 degrees, less than −4 degrees, less than −4.5 degrees, less than −5 degrees, less than −5.5 degrees, less than −6 degrees, less than −6.5 degrees, less than −7 degrees, less than −7.5 degrees, less than −8 degrees, less than −8.5 degrees, less than −9 degrees, or less than −9.5 degrees.

In some embodiments, the cube corner prisms of the retroreflective article are canted edge-more-parallel, e.g., at a cant ranging from 3 degrees to 10 degrees. The cube corner prisms can have a cant ranging from 3 degrees to 8 degrees, from 3.5 degrees to 8.5 degrees, from 4 degrees to 9 degrees, from 4.5 degrees to 9.5 degrees, or from 5 degrees to 10 degrees. The cant can range from 5 degrees to 8 degrees, e.g., from 5 degrees to 6.8 degrees, from 5.3 degrees to 7.1 degrees, from 5.6 degrees to 7.4 degrees, from 5.9 degrees to 7.7 degrees, or from 6.2 degrees to 8 degrees. In terms of upper limits, the cant can be less than 10 degrees, less than 9.5 degrees, less than 9 degrees, less than 8.5 degrees, less than 8 degrees, less than 7.5 degrees, less than 7 degrees, less than 6.5 degrees, less than 6 degrees, less than 5.5 degrees, less than 5 degrees, less than 4.5 degrees, less than 4 degrees, or less than 3.5 degrees. In terms of lower limits, the cant can be greater than 3 degrees, e.g., greater than 3.5 degrees, greater than 4 degrees, greater than 4.5 degrees, greater than 5 degrees, greater than 5.5 degrees, greater than 6 degrees, greater than 6.5 degrees, greater than 7 degrees, greater than 7.5 degrees, greater than 8 degrees, greater than 8.5 degrees, greater than 9 degrees, or greater than 9.5 degrees.

The terms "canted face-more-parallel" and "canted edge-more parallel" as used herein refer to the positioning of the cube relative to the principal refracted ray. When the angles between the cube faces and the principal refracted ray are not all equal to 35.26 degrees, the cube is "face-more-parallel" or "edge-more-parallel" depending upon whether the face angle with respect to the principal refracted ray that is most different from 35.26 degrees is respectively greater or less than 35.26 degrees. In the case of sheeting or other retroreflectors for which the principal refracted ray is nominally perpendicular to the front surface of the retroreflector, then for face-more-parallel cubes the selected cube face will also be more parallel to the reflector front surface than will any face of an uncanted cube.

The data presented in FIG. 6 suggest that in some instances, a third groove half angle of 35 degrees would be preferred since this configuration can give the highest retroreflective efficiency. However, in a display application the head-on efficiency is commonly not the only property of interest. Rather, it is often desirable for a display to have a retroreflective efficiency that is not only high, but also is well maintained for all light entrance angles of the display.

Figure 7:
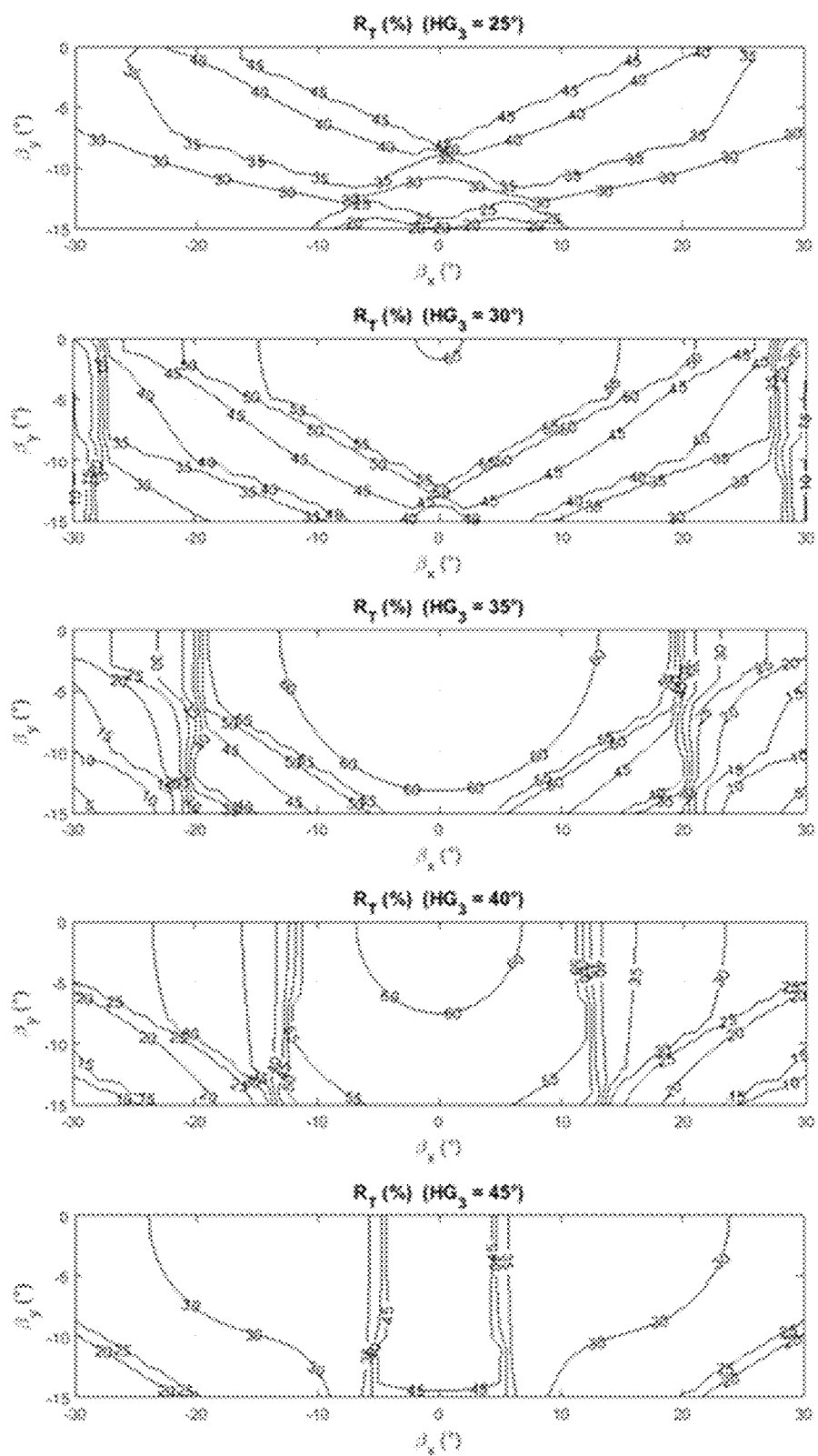
FIG. 7 is a series of plots of retroreflective efficiency versus horizontal and vertical entrance angles for various third groove half angles.

The plots of FIG. 7 show the retroreflective efficiency ($R_T$), as a function of horizontal entrance angle ($\beta_x$) and vertical entrance angle ($\beta_y$) for five values of the third groove half angle ($HG_3$=25 degrees, 30 degrees, 35 degrees, 40 degrees, and 45 degrees). The range of values for $\beta_x$ and $\beta_y$ shown are typical for projection screens. The positions of angle combinations ($\beta_x$, $\beta_y$) shown on the graph roughly correspond topologically to (x, y) positions on a flat display screen with the projector located opposite the top center of the screen. The efficiency value $R_T$ at each position then is one factor in determining the brightness of the corresponding x,y position on the screen.

As expected, the efficiency values shown in FIG. 7 tend to be higher for $HG_3$=35 degrees and fall off at higher or lower half angle values. However, although the head-on efficiency is higher when $HG_3$=35 degrees, there are regions at the edge of the screen that are very dark ($R_T$<5%). For $HG_3$=30 degrees or 40 degrees the uniformity of retroreflective efficiency improves, although there still are some dark regions ($R_T$<10%). For $HG_3$=25 degrees or 45 degrees, the efficiency uniformity improves further, such that for all regions on the screen $R_T$>15%. Other factors can also affect screen uniformity, but based on this estimated analysis it can be preferable to have a third groove half angle within the range between 25 degrees and 28.5 degrees, or within the range between 43.5 degrees and 45.0 degrees. These third groove half angle values correspond to cube corner prisms having a sizable negative or positive cant.

Figure 8:
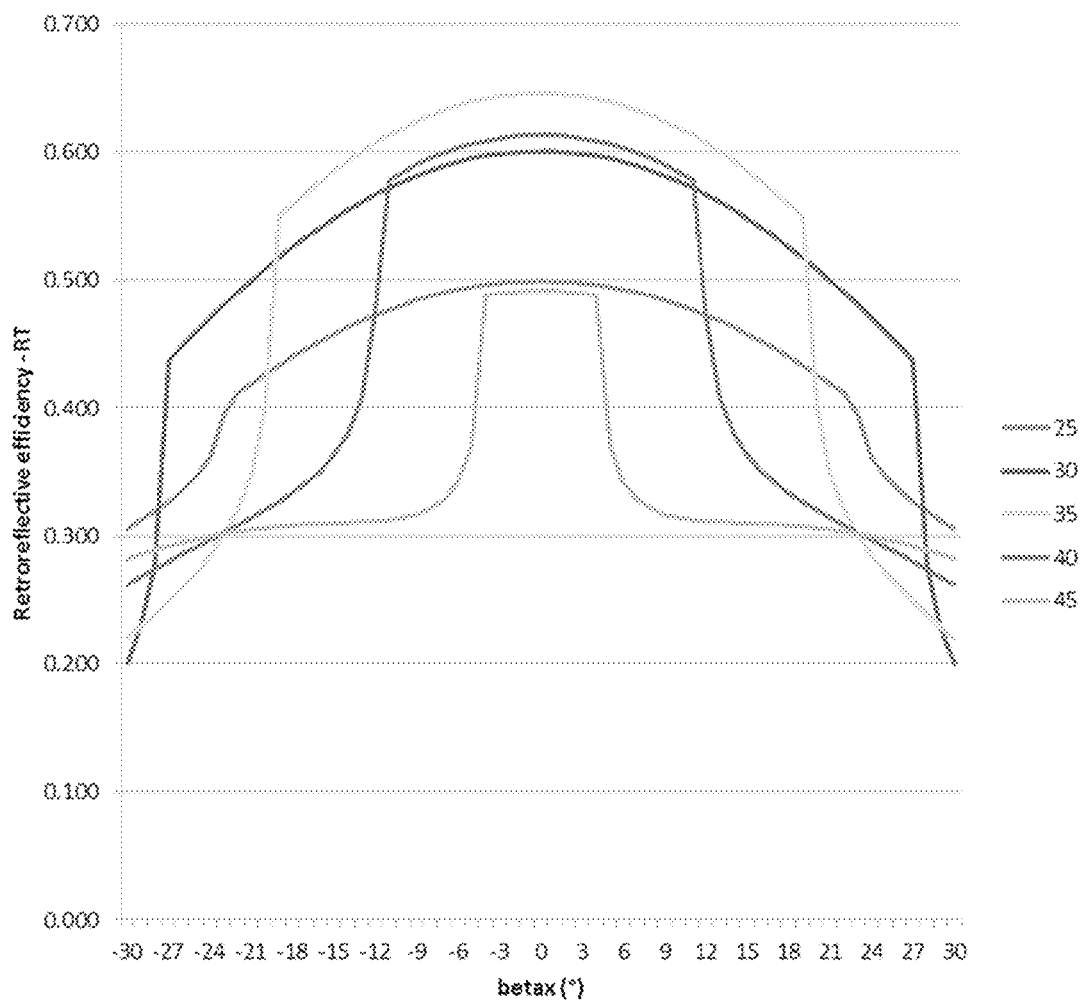
FIG. 8 is a plot of retroreflective efficiency versus horizontal entrance angle for various third groove half angles.

FIG. 8 presents a graph plotting the retroreflective efficiency as a function of the horizontal entrance angle ($\beta_x$) for five different third groove half angle values (25 degrees, 30 degrees, 35 degrees, 40 degrees, and 45 degrees). The trends represent profiles from along the tops of the graphs of FIG. 7. From FIG. 8 it can be seen that there are angles for which the efficiency drops off to a lower level. These instances of rapid efficiency decline can also be seen on the contour graphs of FIG. 7. As discussed above, although the case of $HG_3$=35 degrees has the highest efficiency at $\beta_x$=0 degrees, the efficiency values of this trend drop off dramatically at $\beta_x$=−20 degrees and 20 degrees. This indicates that if a projection scenario involves $\beta_x$ values less than −20 degrees or greater than 20 degrees, as can often be the case, there is a potential for non-uniformity in the perceived brightness of the screen. For the trend line associated with $HG_3$=25 degrees, the overall efficiency also begins to drop, which can be a potential disadvantage. The $HG_3$ values between 25 degrees and 30 degrees have the greatest absence of very dark areas, as well as the least rapid efficiency declines. It is also notable that one of the preferred $HG_3$ ranges of between 43.5 degrees and 45 degrees can also have issues with uniformity. For example, for the case of $HG_3$=45 degrees, the efficiency drops dramatically at $\beta_x$=−5 degrees and 5 degrees. However, at values beyond these, the loss of efficiency corresponds to an increase in visual transparency, which can be a significant advantage for functional and aesthetic reasons.

Another advantage for this third groove half angle range between 43.5 degrees and 45 degrees is that it can provide superior horizontal pattern stability. Changes in $\beta_x$ and $\beta_y$ can move the pattern of retroreflected light horizontally. However, in the case of an $HG_3$ value in the range between 43.5 degrees and 45 degrees, changes due to $\beta_x$ tend to compensate for changes in $\beta_y$, resulting in the pattern staying more stable in the horizontal direction.

Figure 9A:
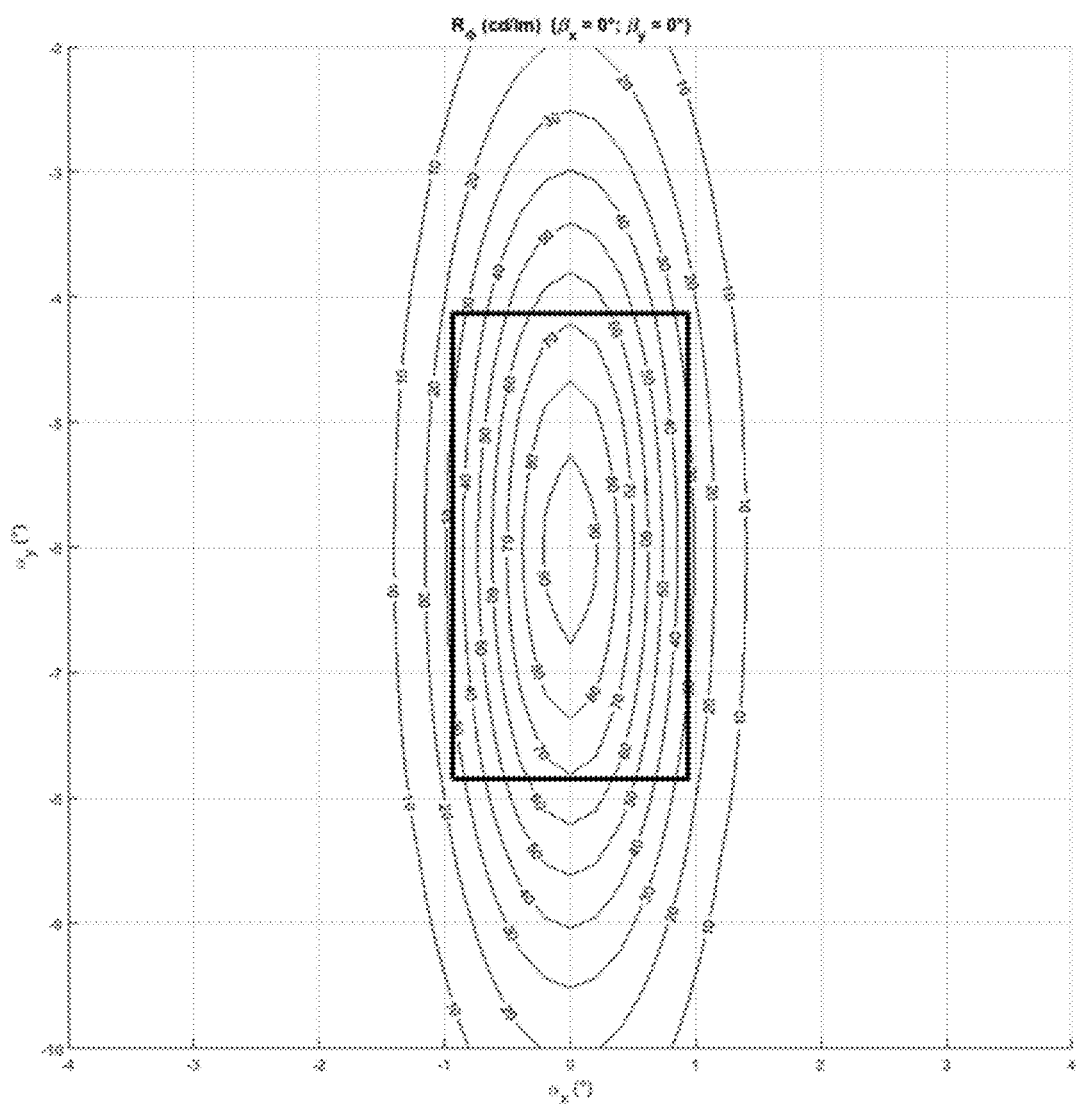
Figure 9B:
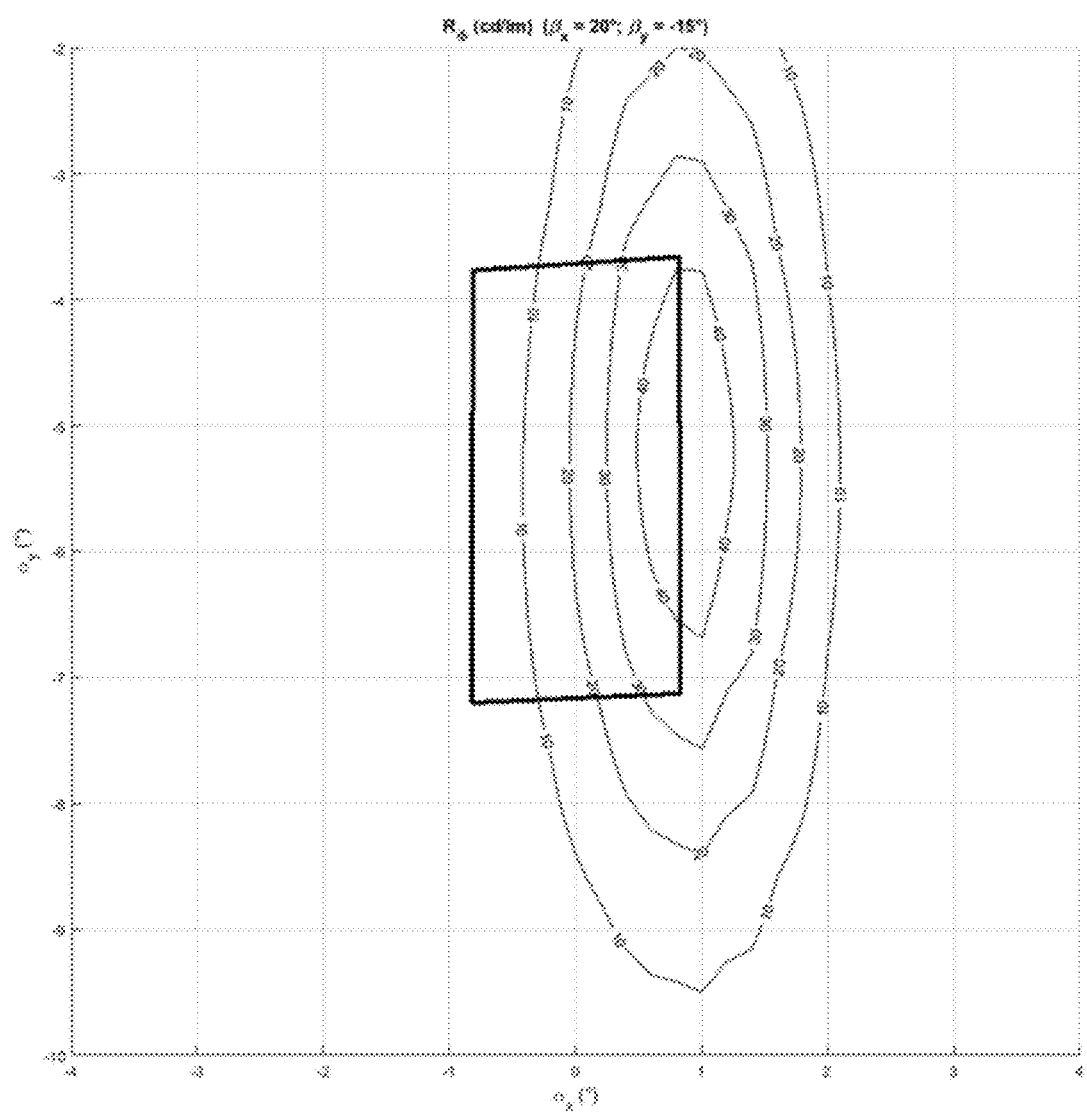
FIG. 9B is a plot of a viewing zone superimposed with the position of a light beam returned by the article of FIG. 9A. The incident light enters the article with a direction tilted 20 degrees to the right of, and 15 degrees below, the head-on direction.

FIG. 9A shows a plot of the position of a light beam returned by a retroreflective article having an offset of 6 degrees, a third groove half angle of 29.5 degrees, and a diffusing film. The plot also shows a viewing zone superimposed on the light beam position for the case of head-on viewing ($\beta_x$=0 degrees, $\beta_y$=0 degrees). If the viewer instead looks obliquely toward the lower right of the screen ($\beta_x$=20 degrees, $\beta_y$=−15 degrees), the pattern of light return shifts both horizontally and vertically as shown in FIG. 9B. The vertical shift to the light position is inconsequential since the desired viewing region also shifts vertically. However, the horizontal shift causes the light return to decrease substantially, particularly in the left portion of the desired viewing region.

Figure 10A:
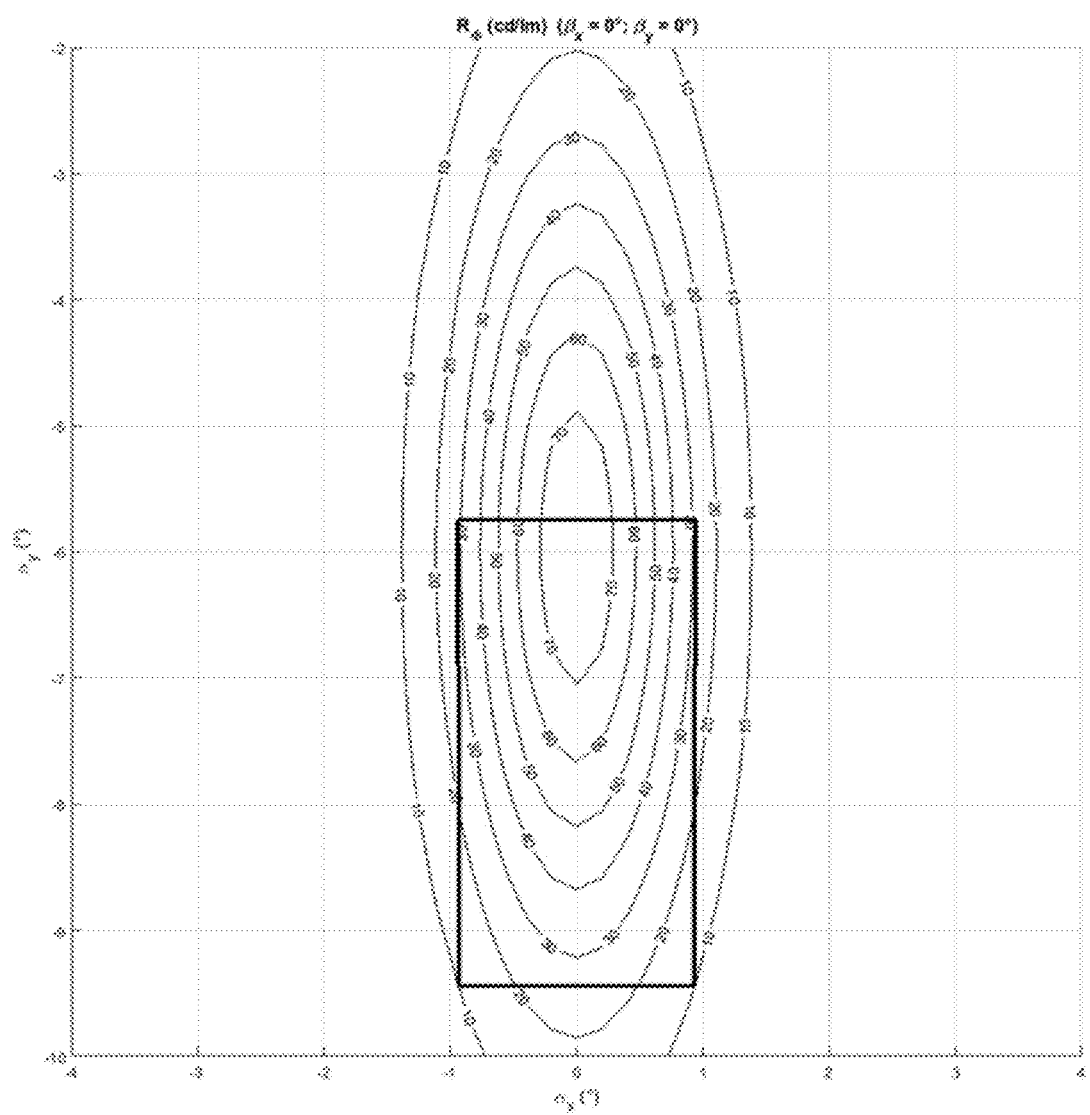
Figure 10B:
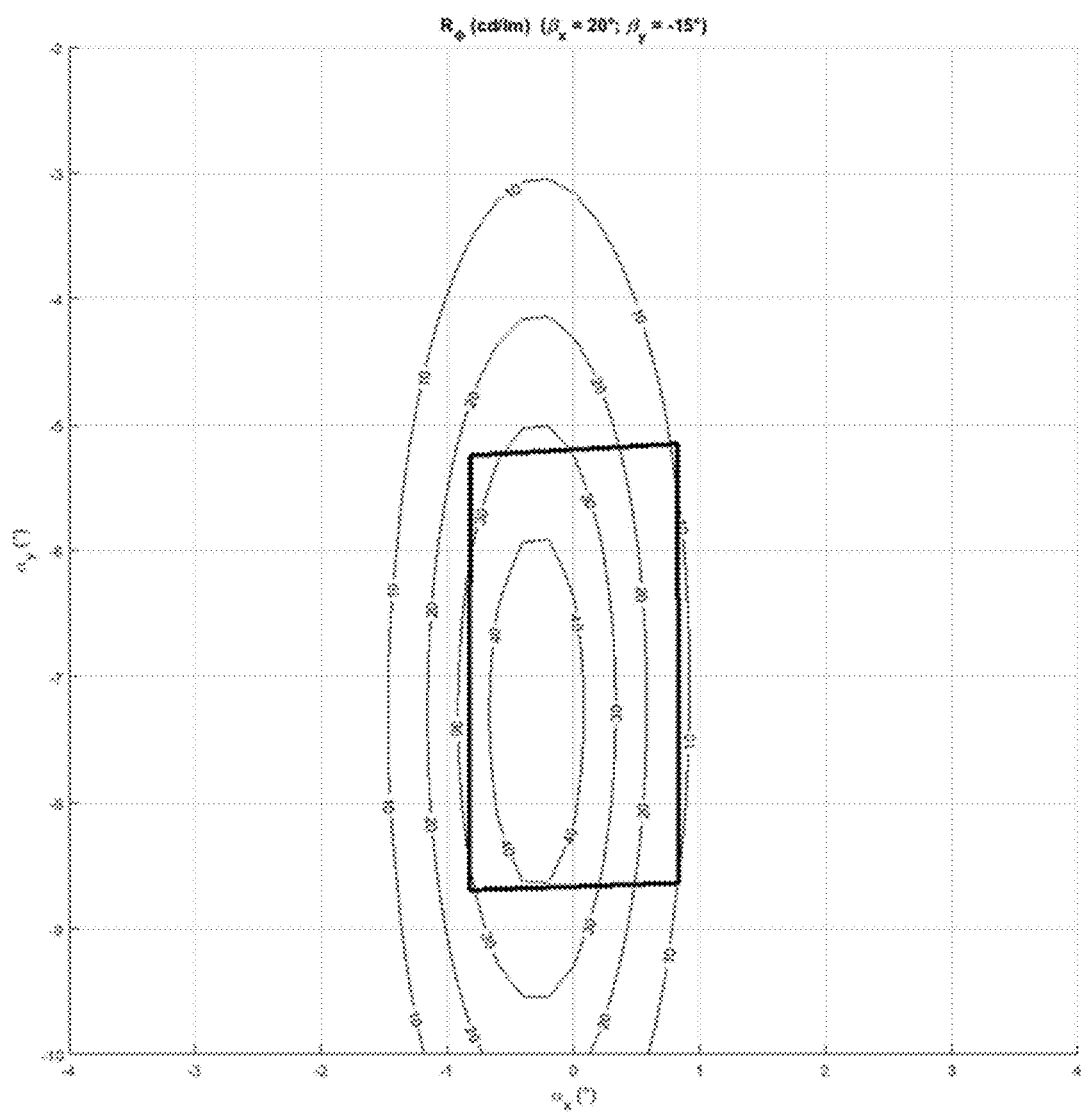
FIG. 10B is a plot of a viewing zone superimposed with the position of a light beam returned by the article of FIG. 10A. The incident light enters the article with a direction tilted 20 degrees to the right of, and 15 degrees below, the head-on direction.

If instead the prism cant is changed such that the third groove half angle is 44.4 degrees, then the light return for head on viewing is as shown on FIG. 10A. In this case, if the viewer instead looks obliquely toward the lower right of the screen ($\beta_x$=20 degrees, $\beta_y$=−15 degrees), the pattern of light return again shifts both horizontally and vertically as shown in FIG. 10B. The vertical downward shift of the pattern of light can be undesirable, but has a reduced negative effect since the pattern of light has a substantial vertical spread. By shifting the desired viewing region downward (e.g., by raising the projector), this vertical shift can be easily accommodated. Importantly, the horizontal shift in this case is significantly less than that of FIG. 9B, and can also be accommodated.

In some applications, it is desirable to have the viewer positioned not directly above or below the projector, but instead offset from the projector in a direction either towards or farther away from the retroreflective article. This forward or backward offset introduces a horizontal instability in the desired viewing area due to parallax. In such cases, an appropriately designed retroreflective article can compensate for the horizontal instability by providing an appropriate amount of horizontal pattern shift.

Figure 11A:
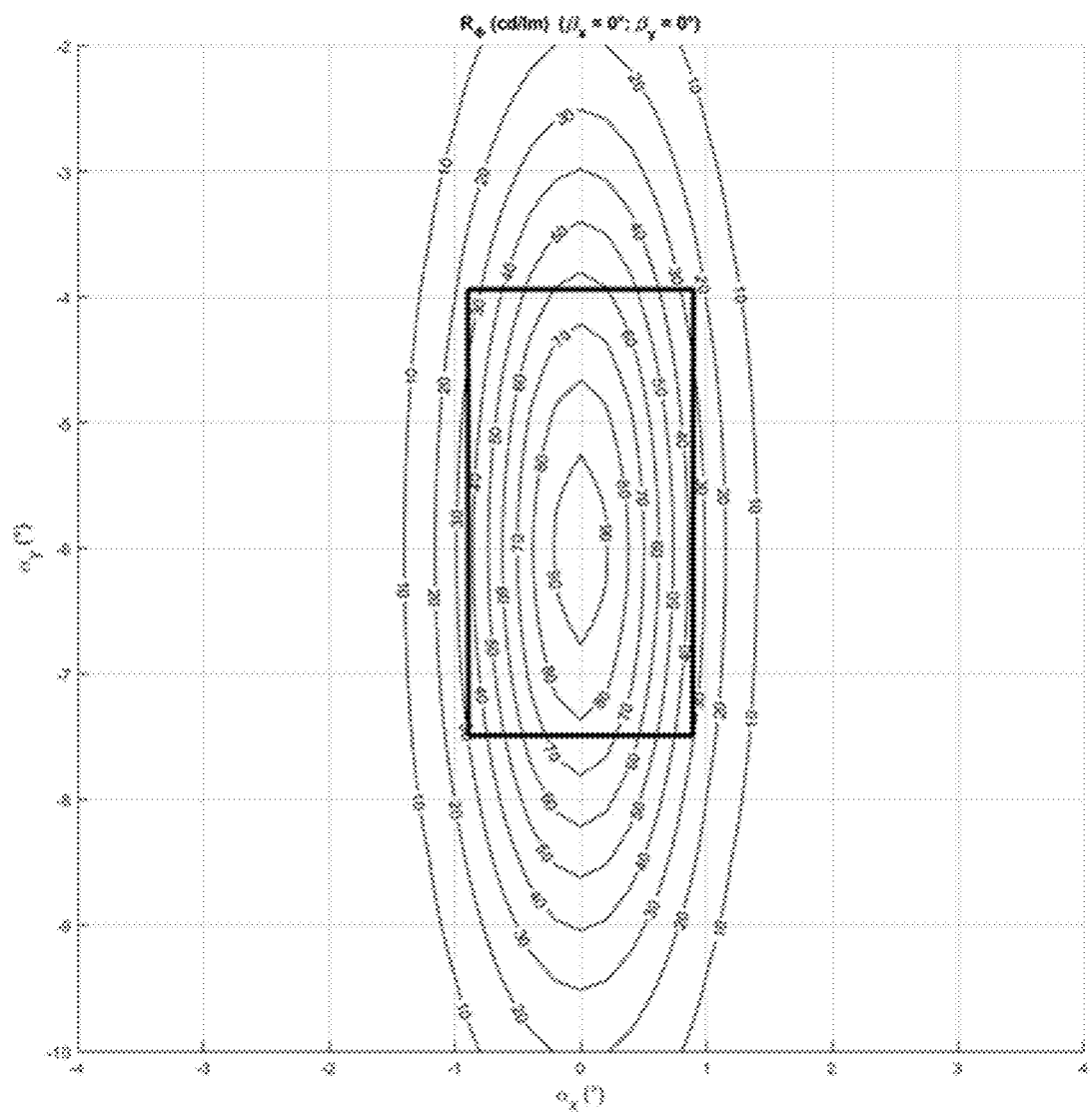
Figure 11B:
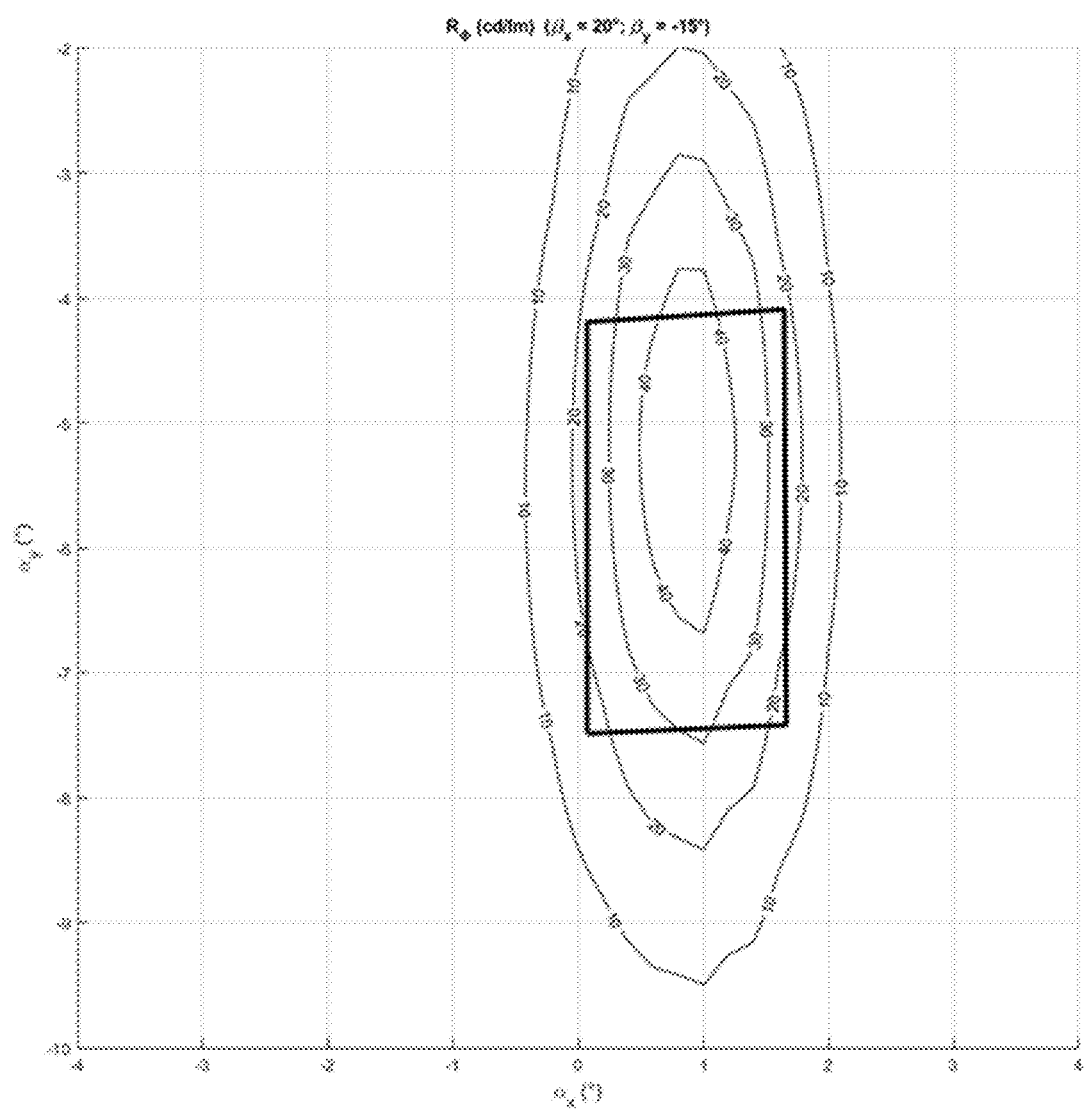
FIG. 11B is a plot of a viewing zone offset 0.3 m behind the projector superimposed with the position of a light beam returned by the article of FIG. 11A. The incident light enters the article with a direction tilted 20 degrees to the right of, and 15 degrees below the head-on direction.

FIG. 11A shows a plot of the position of a light beam returned by the retroreflective article and diffusing film of FIG. 9A superimposed with a viewing zone for head-on viewing offset 0.3 m in a direction away from both the projector and the retroreflective article, e.g., offset 0.3 m behind the projector. From this offset viewing position, if the viewer looks obliquely toward the lower right of the screen ($\beta_x$=20 degrees, $\beta_y$=−15 degrees), the pattern of light return again shifts both horizontally and vertically as shown in FIG. 11B, but the horizontal shift has now been matched by the horizontal shift in the viewing area, reducing the undesired decrease in light return depicted in FIG. 9B with the same retroreflective article configuration.

Figure 12:
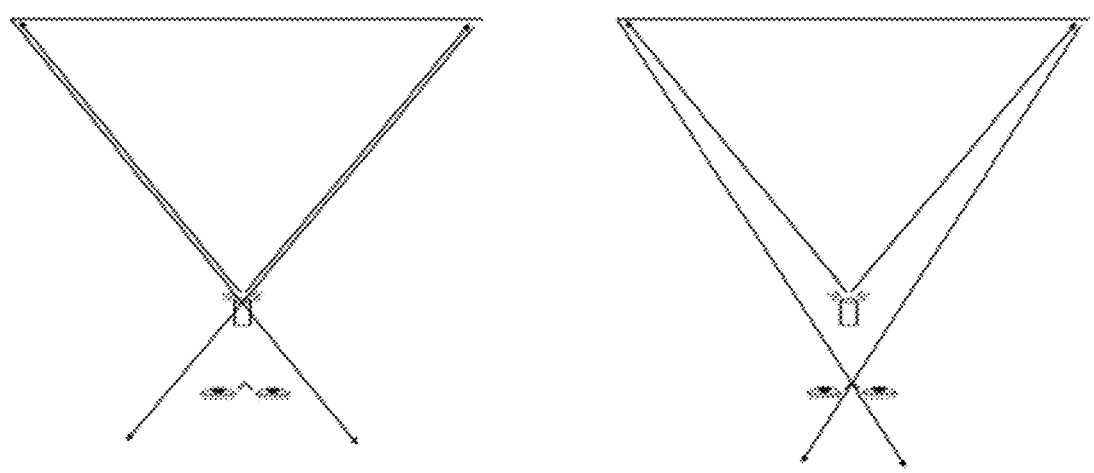
FIG. 12 presents top-down illustrations of viewing retroreflective articles having an HG3 value in the range from 40 degrees to 45 degrees from a position offset behind a projector.
Figure 13:
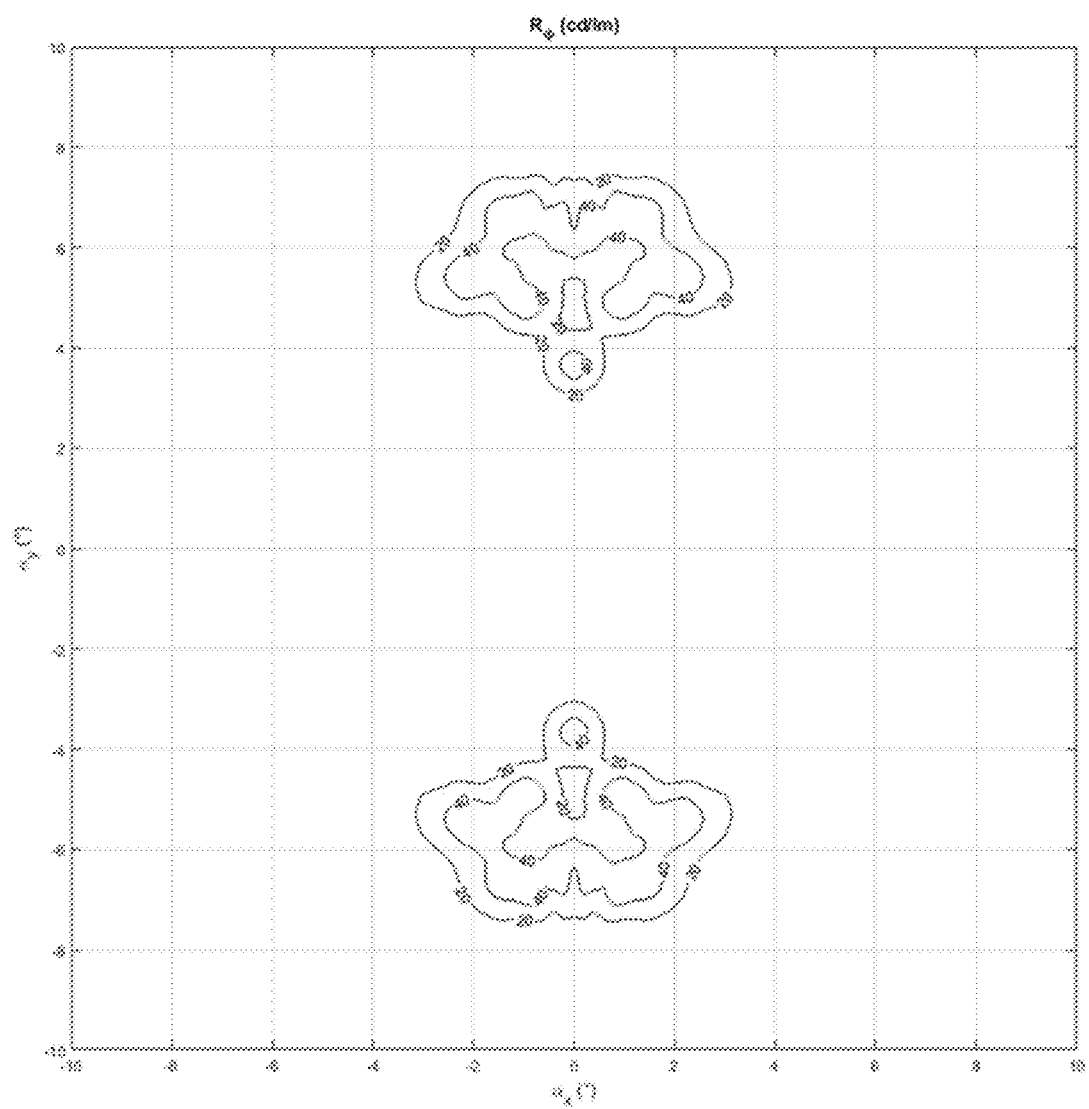
FIG. 13 is a plot of the positions of two vertically asymmetrical light beams returned by a retroreflective article having dihedral angle errors that are not balanced.

An additional advantageous outcome of this small half-angle design (e.g., a configuration having an $HG_3$ value between 25 degrees and 30 degrees) is that the overall brightness uniformity of the screen image can be considerably improved, as is shown in FIG. 12. The left image of FIG. 12 is a top-down illustration of viewing a retroreflective article having an $HG_3$ value in the range from 40 degrees to 45 degrees from a position offset behind a projector and farther away from the retroreflective article. In this case, the right eye of the viewer is in a position far to the right of the return path of light reflecting back from the right side of the retroreflective article, while the left eye of the viewer is in a position far to the left of the return path of light reflecting back from the left side of the retroreflective article. This results in a reduction in effective brightness at the edges of the retroreflective article, and can also cause a significant difference in the levels of brightness perceived by the left and right eyes for the edges of the retroreflective article, which can cause viewer discomfort. The right image of FIG. 12 is a top-down illustration of viewing a small half-angle retroreflective article having an $HG_3$ value in the range of 25 degrees to 30 degrees from the offset position. In this case, all regions of the retroreflective article reflect to the general proximity of the center of the eyes, improving both brightness uniformity and perceived left and right eye brightness balance for the viewer.

The $HG_3$ value for the small half-angle retroreflective article can, for example, range from 25 degrees to 30 degrees, e.g., from 25 degrees to 28 degrees, from 25.5 degrees to 28.5 degrees, from 26 degrees to 29 degrees, from 26.5 degrees to 29.5 degrees, or from 27 degrees to 30 degrees. In terms of upper limits, the $HG_3$ value can be less than 30 degrees, e.g., less than 29.5 degrees, less than 29 degrees, less than 28.5 degrees, less than 28 degrees, less than 27.5 degrees, less than 27 degrees, less than 26.5 degrees, less than 26 degrees, or less than 25.5 degrees. In terms of lower limits, the $HG_3$ value can be greater than 25 degrees, e.g., greater than 25.5 degrees, greater than 26 degrees, greater than 26.5 degrees, greater than 27 degrees, greater than 28 degrees, greater than 29 degrees, or greater than 29.5 degrees. At lower values of $HG_3$, the efficiency of the retroreflective article can be reduced, resulting in lower overall brightness. Also, at lower values of $HG_3$ certain characteristic perceived brightness instabilities can occur at sufficiently low values of $\beta_x$ (e.g., lower than 45 degrees), as can occur in certain screen projection scenarios. These undesirable instabilities can appear as sparkles, bright lines, or streaks on the retroreflective article or screen. Conversely, at higher values of $HG_3$, the performance of the retroreflective article at larger entrance angles is diminished, and there can be a consequent lowering of the brightness at the edge of the retroreflective article.

In some embodiments, the retroreflective elements of the small half-angle retroreflective article are not produced using the technique of tilting the cutting tool to produce pattern spread. Instead, it can be more beneficial for certain applications to configure the retroreflective article to produce narrow reflected beams, and to obtain a desired pattern spread by the alternate means of a diffusing film. In this case, a stronger diffuser can be used, providing the additional benefits of effectively minimizing front surface specular reflection and hiding seams and other cosmetic defects.

The diffusing film used with the small half-angle retroreflective article can have a full-width half-maximum angle of diffusion in a horizontal x-direction ranging, for example, from 1 degree to 4 degrees, e.g., from 1 degree to 2.8 degrees, from 1.3 degrees to 3.1 degrees, from 1.6 degrees to 3.4 degrees, from 1.9 degrees to 3.7 degrees, or from 2.2 degrees to 4 degrees. In terms of upper limits, the horizontal x-direction diffusion angle of the diffuser can be less than 4 degrees, e.g., less than 3.7 degrees, less than 3.4 degrees, less than 3.1 degrees, less than 2.8 degrees, less than 2.5 degrees, less than 2.2 degrees, less than 1.9 degrees, less than 1.6 degrees, or less than 1.3 degrees. In terms of lower limits, the horizontal x-direction diffusion angle of the diffuser can be greater than 1 degree, e.g., greater than 1.3 degrees, greater than 1.6 degrees, greater than 1.9 degrees, greater than 2.2 degrees, greater than 2.5 degrees, greater than 2.8 degrees, greater than 3.1 degrees, greater than 3.4 degrees, or greater than 3.7 degrees. Larger horizontal diffusion angles, e.g., greater than 4 degrees, and smaller horizontal diffusion angles, e.g., less than 1 degree, are also contemplated.

The diffusing film used with the small half-angle retroreflective article can have a full-width half-maximum angle of diffusion in a vertical y-direction ranging, for example, from 3 degrees to 6 degrees, e.g., from 3 degrees to 4.8 degrees, from 3.3 degrees to 5.1 degrees, from 3.6 degrees to 5.4 degrees, from 3.9 degrees to 5.7 degrees, or from 4.2 degrees to 6 degrees. In terms of upper limits, the vertical y-direction diffusion angle of the diffuser can be less than 6 degrees, e.g., less than 5.7 degrees, less than 5.4 degrees, less than 5.1 degrees, less than 4.8 degrees, less than 4.5 degrees, less than 4.2 degrees, less than 3.9 degrees, less than 3.6 degrees, or less than 3.3 degrees. In terms of lower limits, the vertical y-direction diffusion angle of the diffuser can be greater than 3 degrees, e.g., greater than 3.3 degrees, greater than 3.6 degrees, greater than 3.9 degrees, greater than 4.2 degrees, greater than 4.5 degrees, greater than 4.8 degrees, greater than 5.1 degrees, greater than 5.4 degrees, or greater than 5.7 degrees. Larger vertical diffusion angles, e.g., greater than 6 degrees, and smaller vertical diffusion angles, e.g., less than 3 degrees, are also contemplated.

In certain aspects, the prisms of the small half-angle retroreflective article have a third dihedral angle error that has a magnitude greater than 1 degrees. The third dihedral angle error can, for example, range from −4 degrees to −1 degrees, e.g., from −4 degrees to −2.2 degrees, from −3.7 degrees to −1.9 degrees, from −3.4 degrees to −1.6 degrees, from −3.1 degrees to −1.3 degrees, or from −2.8 degrees to −1 degrees. In terms of upper limits, the third dihedral angle error can be less than −1 degrees, e.g., less than −1.3 degrees, less than −1.6 degrees, less than −1.9 degrees, less than −2.2 degrees, less than −2.5 degrees. less than −2.8 degrees, less than −3.1 degrees, less than −3.4 degrees, or less than −3.7 degrees. In terms of upper limits, the third angle dihedral angle error can be greater than −4 degrees. e.g., greater than −3.7 degrees, greater than −3.4 degrees, greater than −3.1 degrees, greater than −2.8 degrees, greater than −2.5 degrees, greater than −2.2 degrees, greater than −1.9 degrees, greater than −1.6 degrees, or greater than −1.3 degrees. Larger third dihedral angle errors, e.g., greater than −1 degrees, and smaller dihedral angle errors, e.g., less than −4 degrees, are also contemplated.

The third dihedral angle error can, for example, range from 1 degree to 4 degrees, e.g., from 1 degree to 2.8 degrees, from 1.3 degrees to 3.1 degrees, from 1.6 degrees to 3.4 degrees, from 1.9 degrees to 3.7 degrees, or from 2.2 degrees to 4 degrees. In terms of upper limits, the third dihedral angle error can be less than 4 degrees, e.g., less than 3.7 degrees, less than 3.4 degrees, less than 3.1 degrees, less than 2.8 degrees, less than 2.5 degrees, less than 2.2 degrees, less than 1.9 degrees, less than 1.6 degrees, or less than 1.3 degrees. In terms of lower limits, the third dihedral angle error can be greater than 1 degree, e.g., greater than 1.3 degrees, greater than 1.6 degrees, greater than 1.9 degrees, greater than 2.2 degrees, greater than 2.5 degrees, greater than 2.8 degrees, greater than 3.1 degrees, greater than 3.4 degrees, or greater than 3.7 degrees. Larger dihedral angle errors, e.g., greater than 4 degrees, and smaller dihedral angle errors, e.g., less than 1 degree, are also contemplated. In certain aspects, the first and second dihedral angle errors of the prisms of the retroreflective article are each 0 degrees.

In some embodiments, the prisms of the small half-angle retroreflective article are each canted edge-more-parallel at a cant greater than 0 degrees. The cant of each prism can, for example, range from 0 degrees to 10 degrees, e.g., from 0 degrees to 6 degrees, from 1 degree to 7 degree, from 2 degrees to 8 degrees, from 3 degrees to 9 degrees, or from 4 degrees to 10 degrees. In terms of upper limits, the cant of each prism can be less than 10 degrees, e.g., less than 9 degrees, less than 8 degrees, less than 7 degrees, less than 6 degrees, less than 5 degrees, less than 4 degrees, less than 3 degrees, less than 2 degrees, or less than 1 degree. In terms of lower limits, the cant of each prism can be greater than 0 degrees, e.g., greater than 1 degree, greater than 2 degrees, greater than 3 degrees, greater than 4 degrees, greater than 5 degrees, greater than 6 degrees, greater than 7 degrees, greater than 8 degrees, or greater than 9 degrees. Larger prism cants, e.g., greater than 10 degrees, are also contemplated.

The present disclosure also relates to a display system that includes the retroreflective article as described above. The system also includes a light source that produces the incident light beam at least in the direction of the retroreflective article. In a preferred embodiment, the light source is a projector configured to direct an incident light beam towards the retroreflective article. The incident light can be, for example, a still image or a video image. In some embodiments, the system includes two or more light sources or projectors. Each of the one or more projectors can include one or more optical elements for directing and/or focusing an image or video onto the retroreflective article. Projectors can include, for example and without limitation, film projectors, cathode ray tube (CRT) projectors, laser projectors, Digital Light Processor (DLP) or Digital Micromirror Device (DMD) projectors, liquid crystal display (LCD) projectors, or liquid crystal on silicon (LCOS) projectors.

The system can also include a computer processor operatively connected with a machine-readable non-transitory storage medium. Storage media can include any or all of the tangible memory of the computers, processors or the like, or associated modules thereof, such as various semiconductor memories, tape drives, disk drives and the like, which can provide non-transitory storage at any time for software programming. All or portions of the software can at times be communicated through the Internet or various other telecommunication networks. Such communications, for example, can enable loading of the software from one computer or processor into another, for example, from a management server or host computer into the computer platform of an application server. Thus, another type of media that can bear the software elements includes optical, electrical, and electromagnetic waves, such as used across physical interfaces between local devices, through wired and optical landline networks, and over various air-links. The physical elements that carry such waves, such as wired or wireless links, optical links or the like, also can be considered as media bearing the software. Through the software, for example, the storage medium can embody information indicative of instructions for causing the processor to perform operations. The operations can include, for example, controlling the light source or projector to direct the incident light beam towards the retroreflective article.

The following embodiments are contemplated. All combinations of features and embodiment are contemplated.

Embodiment 1

A retroreflective article comprising: a retroreflective film comprising opposing front and back surfaces; and a plurality of retroreflective elements disposed on the back surface of the retroreflective film; wherein each of the retroreflective elements comprises a non-equilateral triangular pyramid prism bounded by one of a first set of substantially parallel and v-shaped first grooves, one of a second set of substantially parallel and v-shaped second grooves, and one of a third set of substantially parallel and v-shaped third grooves; wherein each of the grooves comprises a groove axis and two intersecting groove sides; wherein each groove side of a groove forms a half angle between the groove side and a plane parallel to the groove axis of the groove and orthogonal to the back surface of the retroreflective film; and wherein at least one of the half angles ranges from 25.0 degrees to 28.5 degrees, or ranges from 43.5 degrees to 45.0 degrees.

Embodiment 2

An embodiment of embodiment 1, wherein at least one of the half angles ranges from 25.0 degrees to 28.5 degrees.

Embodiment 3

An embodiment of embodiment 1, wherein at least one of the half angles ranges from 43.5 degrees to 45.0 degrees.

Embodiment 4

An embodiment of any embodiment of embodiments 1-3, wherein each of the retroreflective elements comprises a first, second, and third triangular face; wherein the first, second, and third triangular faces intersect at an apex configured to point away from the back surface; wherein the first and second triangular faces are substantially congruent triangles; and wherein the third triangular face is not congruent with the first and second triangular faces.

Embodiment 5

An embodiment of any embodiment of embodiments 1-4, wherein each prism has a first, second, and third dihedral angle error; and wherein the magnitude of each dihedral angle error ranges from 0.01 degrees to 10 degrees.

Embodiment 6

An embodiment of embodiment 5, wherein the magnitude of each dihedral angle error ranges from 0.01 degrees to 4 degrees.

Embodiment 7

An embodiment of embodiment 5 or 6, wherein the magnitude of each third dihedral angle error is greater than 1 degree.

Embodiment 8

An embodiment of any embodiment of embodiments 5-7, wherein the magnitude of the average of the first dihedral angle errors is less than 0.3 degrees, wherein the magnitude of the average of the second dihedral errors is less than 0.3 degrees, and wherein the average of the third dihedral angle errors is less than −1 degrees.

Embodiment 9

An embodiment of any embodiment of embodiments 1-8, wherein adjacent first grooves are separated by a first spacing ranging from 0.1 mm to 0.2 mm; wherein adjacent second grooves are separated by a second spacing substantially identical to the first spacing; and wherein adjacent third grooves are separated by a third spacing smaller than the first and second spacing.

Embodiment 10

An embodiment of any embodiment of embodiments 1-9, wherein the depth of each prism ranges from 1 mil to 5 mils.

Embodiment 11

An embodiment of any embodiment of embodiments 1-10, wherein the each prism is canted face-more-parallel.

Embodiment 12

An embodiment of embodiment 11, wherein each prism is canted at a cant angle ranging from −5 degrees to −8 degrees.

Embodiment 13

An embodiment of any embodiment of embodiments 1-10, wherein each prism is canted edge-more-parallel.

Embodiment 14

An embodiment of embodiment 13, wherein each prism is canted at a cant angle ranging from 4 degrees to 8 degrees.

Embodiment 15

An embodiment of any embodiment of embodiments 1-14, further comprising: a diffusing film having a full-width half-maximum angle of diffusion of less than 1 degree in a horizontal x direction substantially parallel to the front surface of the retroreflective film when the front and back surfaces of the retroreflective film are positioned vertically.

Embodiment 16

An embodiment of any embodiment of embodiments 1-14, further comprising: a diffusing film having a full-width half-maximum angle of diffusion of greater than 3 degrees in a vertical y direction substantially parallel to the front surface of the retroreflective film when the front and back surfaces of the retroreflective film are positioned vertically.

Embodiment 17

An embodiment of any embodiment of embodiments 1-14, further comprising: a diffusing film having: (1) a full-width half-maximum angle of diffusion of less than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically.

Embodiment 18

An embodiment of any embodiment of embodiments 15-17, wherein the diffusing film is directly adjacent to the front surface of the retroreflective film.

Embodiment 19

An embodiment of any embodiment of embodiments 1-18, wherein the retroreflective film comprises acrylic or polycarbonate.

Embodiment 20

An embodiment of any embodiment of embodiments 1-19, wherein each of the retroreflective elements are air-backed.

Embodiment 21

An embodiment of any embodiment of embodiments 1-20, wherein the retroreflective article is a display screen.

Embodiment 22

A retroreflective article comprising: a retroreflective film comprising opposing front and back surfaces; and a plurality of retroreflective elements disposed on the back surface of the retroreflective film; wherein each of the retroreflective elements is a non-equilateral triangular pyramid prism comprising a triangular base; and wherein the triangular base comprises two sides that differ in length from one another such that the ratio of the length of the smaller of the two sides to the length of the larger of the two sides ranges from 80% to 92.5%.

Embodiment 23

An embodiment of embodiment 22, wherein the ratio of the length of the smaller of the two sides to the length of the larger of the two sides ranges from 83% to 90%.

Embodiment 24

An embodiment of embodiment 22 or 23, wherein each retroreflective element further comprises a first, second, and third triangular face; wherein the first, second, and third triangular faces intersect at an apex configured to point away from the back surface; wherein the first and second triangular faces are substantially congruent triangles; and wherein the third triangular face is not congruent with the first and second triangular faces.

Embodiment 25

An embodiment of any embodiment of embodiments 22-24, wherein each prism has a first, second, and third dihedral angle error; and wherein the magnitude of each dihedral angle error ranges from 0.01 degrees to 10 degrees.

Embodiment 26

An embodiment of embodiment 25, wherein the magnitude of each dihedral angle error ranges from 0.01 degrees to 4 degrees.

Embodiment 27

An embodiment of embodiment 25 or 26, wherein the magnitude of each third dihedral angle error is greater than 1 degree.

Embodiment 28

An embodiment of any embodiment of embodiments 25-27, wherein the magnitude of the average of the first dihedral angle errors is less than 0.3 degrees, wherein the magnitude of the average of the second dihedral errors is less than 0.3 degrees, and wherein the average of the third dihedral angle errors is less than −1 degrees.

Embodiment 29

An embodiment of any embodiment of embodiments 22-28, wherein each of the retroreflective elements comprises a non-equilateral triangular pyramid prism bounded by one of a first set of substantially parallel and v-shaped first grooves, one of a second set of substantially parallel and v-shaped second grooves, and one of a third set of substantially parallel and v-shaped third grooves; wherein adjacent first grooves are separated by a first spacing ranging from 0.1 mm to 0.2 mm; wherein adjacent second grooves are separated by a second spacing substantially identical to the first spacing; and wherein adjacent third grooves are separated by a third spacing smaller than the first and second spacing.

Embodiment 30

An embodiment of any embodiment of embodiments 22-29, wherein the depth of each prism ranges from 1 mil to 5 mils.

Embodiment 31

An embodiment of any embodiment of embodiments 22-30, wherein the each prism is canted face-more-parallel.

Embodiment 32

An embodiment of embodiment 31, wherein each prism is canted at a cant angle ranging from −5 degrees to −8 degrees.

Embodiment 33

An embodiment of any embodiment of embodiments 22-30, wherein each prism is canted edge-more-parallel.

Embodiment 34

An embodiment of embodiment 33, wherein each prism is canted at a cant angle ranging from 5 degrees to 8 degrees.

Embodiment 35

An embodiment of any embodiment of embodiments 22-34, further comprising: a diffusing film having a full-width half-maximum angle of diffusion of less than 1 degree in a horizontal x direction substantially parallel to the front surface of the retroreflective film when the front and back surfaces of the retroreflective film are positioned vertically.

Embodiment 36

An embodiment of any embodiment of embodiments 22-34, further comprising: a diffusing film having a full-width half-maximum angle of diffusion of greater than 3 degrees in a vertical y direction substantially parallel to the front surface of the retroreflective film when the front and back surfaces of the retroreflective film are positioned vertically.

Embodiment 37

An embodiment of any embodiment of embodiments 22-34, further comprising: a diffusing film having: (1) a full-width half-maximum angle of diffusion of less than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically.

Embodiment 38

An embodiment of any embodiment of embodiments 35-37, wherein the diffusing film is directly adjacent to the front surface of the retroreflective film.

Embodiment 39

An embodiment of any embodiment of embodiments 22-38, wherein the retroreflective film comprises acrylic or polycarbonate.

Embodiment 40

An embodiment of any embodiment of embodiments 22-39, wherein each of the retroreflective elements are air-backed.

Embodiment 41

An embodiment of any embodiment of embodiments 22-40, wherein the retroreflective article is a display screen.

Embodiment 42

A retroreflective article comprising: a retroreflective film comprising opposing front and back surfaces; and a plurality of retroreflective elements disposed on the back surface of the retroreflective film; wherein each of the retroreflective elements comprises a non-equilateral triangular pyramid prism having a third dihedral angle error less than −1 degrees; wherein each prism is bounded by one of a first set of substantially parallel and v-shaped first grooves, one of a second set of substantially parallel and v-shaped second grooves, and one of a third set of substantially parallel and v-shaped third grooves; wherein each of the grooves comprises a groove axis and two intersecting groove sides; wherein each groove side of a groove forms a half angle between the groove side and a plane parallel to the groove axis of the groove and orthogonal to the back surface of the retroreflective film; and wherein at least one of the half angles ranges from 25 degrees to 30 degrees.

Embodiment 43

An embodiment of embodiment 42, wherein the third dihedral angle ranges from −1 degrees to −4 degrees.

Embodiment 44

An embodiment of embodiment 42 or 43, further comprising: a diffusing film having: (1) a full-width half-maximum angle of diffusion of greater than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically.

Embodiment 45

An embodiment of embodiment 44, wherein the diffusing film is directly adjacent to the front surface of the retroreflective film.

Embodiment 46

An embodiment of any embodiment of embodiments 42-45, wherein each of the retroreflective elements comprises a first, second, and third triangular face; wherein the first, second, and third triangular faces intersect at an apex configured to point away from the back surface; wherein the first and second triangular faces are substantially congruent triangles; and wherein the third triangular face is not congruent with the first and second triangular faces.

Embodiment 47

An embodiment of any embodiment of embodiments 42-46, wherein adjacent first grooves are separated by a first spacing ranging from 0.1 mm to 0.2 mm; wherein adjacent second grooves are separated by a second spacing substantially identical to the first spacing; and wherein adjacent third grooves are separated by a third spacing larger than the first and second spacing.

Embodiment 48

An embodiment of any embodiment of embodiments 42-47, wherein the depth of each prism ranges from 1 mil to 5 mils.

Embodiment 49

An embodiment of any embodiment of embodiments 42-48, wherein each prism is canted edge-more-parallel at a cant ranging from 4 degrees to 10 degrees.

Embodiment 50

An embodiment of any embodiment of embodiments 42-49, wherein the retroreflective film comprises acrylic or polycarbonate.

Embodiment 51

An embodiment of any embodiment of embodiments 42-50, wherein each of the retroreflective elements are air-backed.

Embodiment 52

An embodiment of any embodiment of embodiments 42-51, wherein the retroreflective article is a display screen.

Embodiment 53

A retroreflective article comprising: a retroreflective film comprising opposing front and back surfaces; and a plurality of retroreflective elements disposed on the back surface of the retroreflective film; wherein each of the retroreflective elements comprises a non-equilateral triangular pyramid prism bounded by one of a first set of substantially parallel and v-shaped first grooves, one of a second set of substantially parallel and v-shaped second grooves, and one of a third set of substantially parallel and v-shaped third grooves; wherein each of the grooves comprises a groove axis and two intersecting groove sides; wherein each groove side of a groove forms a half angle between the groove side and a plane parallel to the groove axis of the groove and orthogonal to the back surface of the retroreflective film; wherein at least one of the half angles ranges from 25.0 degrees to 30.0 degrees; and wherein each prism is canted edge-more-parallel at a cant angle greater than 0 degrees.

Embodiment 54

An embodiment of embodiment 53, wherein each prism is canted at a cant angle ranging from 4 degrees to 10 degrees.

Embodiment 55

An embodiment of embodiment 53 or 54, further comprising: a diffusing film having: (1) a full-width half-maximum angle of diffusion of greater than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically.

Embodiment 56

An embodiment of embodiment 55, wherein the diffusing film is directly adjacent to the front surface of the retroreflective film.

Embodiment 57

An embodiment of any embodiment of embodiments 53-56, wherein each of the retroreflective elements comprises a first, second, and third triangular face; wherein the first, second, and third triangular faces intersect at an apex configured to point away from the back surface; wherein the first and second triangular faces are substantially congruent triangles; and wherein the third triangular face is not congruent with the first and second triangular faces.

Embodiment 58

An embodiment of any embodiment of embodiments 53-57, wherein each prism has a third dihedral angle error ranging from −4 degrees to −1 degrees.

Embodiment 59

An embodiment of any embodiment of embodiments 53-58, wherein adjacent first grooves are separated by a first spacing ranging from 0.1 mm to 0.2 mm; wherein adjacent second grooves are separated by a second spacing substantially identical to the first spacing; and wherein adjacent third grooves are separated by a third spacing larger than the first and second spacing.

Embodiment 60

An embodiment of any embodiment of embodiments 53-59, wherein the depth of each prism ranges from 1 mil to 5 mils.

Embodiment 61

An embodiment of any embodiment of embodiments 53-60, wherein the retroreflective film comprises acrylic or polycarbonate.

Embodiment 62

An embodiment of any embodiment of embodiments 53-61, wherein each of the retroreflective elements are air-backed.

Embodiment 63

An embodiment of any embodiment of embodiments 53-62, wherein the retroreflective article is a display screen.

Embodiment 64

A display system comprising: the retroreflective article of any embodiment of embodiments 1-63; a projector configured to direct an incident light beam towards the retroreflective article; and a computer processor operatively connected with a machine-readable non-transitory medium embodying information indicative of instructions for causing the computer processor to perform operations comprising controlling the projector to direct the incident light beam towards the retroreflective article; wherein the retroreflective article is configured to reflect the incident light beam such that the majority of reflected light is divided into (1) a first reflected light beam offset from the incident light beam by a first reflected angle greater than 1 degree, and (2) a second reflected light beam offset from the incident light beam by a second reflected angle having a magnitude substantially identical to that of the first reflected angle and a direction opposite that of the first reflected angle relative to the incident light beam.

Embodiment 65

An embodiment of embodiment 64, wherein the first reflected angle is greater than 4 degrees above the incident light beam, and the second reflected angle is greater than 4 degrees below the incident light beam, when the front and back surfaces of the retroreflective film are positioned vertically.

Embodiment 66

An embodiment of embodiment 64 or 65, wherein the first reflected light beam has a first brightness, and wherein the second reflected light beam has a second brightness substantially identical to that of the first reflected light beam.

Embodiment 67

A method of displaying an image, the method comprising: providing a retroreflective article of any embodiment of embodiments 1-63; providing a projector; and controlling the projector to direct an incident light beam towards the retroreflective article, thereby reflecting the incident light beam into (1) a first reflected light beam offset from the incident light beam by a first reflected angle greater than 1 degree, and (2) a second reflected light beam offset from the incident light beam by a second reflected angle having a magnitude substantially identical to that of the first reflected angle and a direction opposite that of the first reflected angle relative to the incident light beam.

Embodiment 68

An embodiment of embodiment 67, wherein the first reflected angle is greater than 4 degrees above the incident light beam, and the second reflected angle is greater than 4 degrees below the incident light beam, when the front and back surfaces of the retroreflective film are positioned vertically.

Embodiment 69

An embodiment of embodiment 67 or 68, wherein the first reflected light beam has a first brightness, and wherein the second reflected light beam has a second brightness substantially identical to that of the first reflected light beam.

EXAMPLES

The present disclosure will be better understood in view of the following non-limiting example. An exemplary retroreflective article includes three sets of parallel grooves cut into an acrylic film. The grooves of the first set have half angles of 29.67 degrees and 29.14 degrees, and are separated from one another by a spacing of 0.142 mm. The grooves of the second set also have half angles of 29.67 degrees and 29.14 degrees, and are separated from one another by a spacing of 0.142 mm. The grooves of the third set have half angles of 44.55 degrees and 44.33 degrees, and are separated from one another by a spacing of 0.128 mm. Together the grooves create cube corner retroreflective elements having a cube corner depth of 2.5 mils, and a cube cant of approximately −6.5 degrees (or 6.5 degrees face-more-parallel). The individual cube corner elements belong to one of eight groups, depending on the bordering groove half angles. Dimensions, including dihedral angles for each of the eight groups are shown in Table 1 below.

TABLE 1

Cube Corner Dimensions

| Cube corner | Half groove angle $HG_1$ (°) | Half groove angle $HG_2$ (°) | Half groove angle $HG_3$ (°) | Dihedral angle error $e_1$ (°) | Dihedral angle error $e_2$ (°) | Dihedral angle error $e_3$ (°) |
|---|---|---|---|---|---|---|
| 1 | 29.67 | 29.67 | 44.55 | 0.33 | 0.33 | −2.55 |
| 2 | 29.67 | 29.67 | 44.33 | 0.18 | 0.18 | −2.55 |
| 3 | 29.67 | 29.14 | 44.55 | −0.10 | 0.33 | −2.87 |
| 4 | 29.67 | 29.14 | 44.33 | −0.25 | 0.18 | −2.87 |
| 5 | 29.14 | 29.67 | 44.55 | 0.33 | −0.10 | −2.87 |
| 6 | 29.14 | 29.67 | 44.33 | 0.18 | −0.25 | −2.87 |
| 7 | 29.14 | 29.14 | 44.55 | −0.10 | −0.10 | −3.18 |
| 8 | 29.14 | 29.14 | 44.33 | −0.25 | −0.25 | −3.18 |
| Avg | 29.41 | 29.41 | 44.44 | 0.04 | 0.04 | −2.87 |

As shown in Table 1, cube corners 1 and 8 both have first and second dihedral angle errors that are identical to one another. Furthermore, the first and second dihedral angle errors of cube corner 1 have a comparable magnitude and opposite sign to the first and second dihedral angle errors of cube corner 8. Also, the average of the first dihedral angle errors of the eight cube corners, as well as the average of the second dihedral angle errors of the eight cube corners, is close to zero. This indicates that the configuration of the retroreflective element array is substantially balanced. Such a balanced configuration has been shown to provide a more symmetrical light beam profile, such as those of FIGS. 1-3.

In contrast, if the averages of the first and/or second dihedral angle errors have magnitudes significantly greater than zero, as shown in Table 2 below, then the profile can become more asymmetrical. This is the case for the profiles of FIG. 11, which represent light beam positions for a retroreflective article having more positive average first and second dihedral angle errors. The change in width for the FIG. 11 light beam profiles with respect to height can provide some benefits for certain applications, although in general more symmetrical profiles are preferred.

TABLE 2

Cube Corner Dimensions for FIG. 11

| Cube corner | Half groove angle $HG_1$ (°) | Half groove angle $HG_2$ (°) | Half groove angle $HG_3$ (°) | Dihedral angle error $e_1$ (°) | Dihedral angle error $e_2$ (°) | Dihedral angle error $e_3$ (°) |
|---|---|---|---|---|---|---|
| 1 | 29.71 | 29.71 | 45.07 | 0.67 | 0.67 | −2.55 |
| 2 | 29.71 | 29.71 | 44.85 | 0.51 | 0.51 | −2.55 |
| 3 | 29.71 | 29.17 | 45.07 | 0.24 | 0.67 | −2.87 |
| 4 | 29.71 | 29.17 | 44.85 | 0.08 | 0.51 | −2.87 |
| 5 | 29.17 | 29.71 | 45.07 | 0.67 | 0.24 | −2.87 |
| 6 | 29.17 | 29.71 | 44.85 | 0.51 | 0.08 | −2.87 |
| 7 | 29.17 | 29.17 | 45.07 | 0.24 | 0.24 | −3.18 |
| 8 | 29.14 | 29.17 | 44.85 | 0.08 | 0.08 | −3.18 |
| Avg | 29.44 | 29.44 | 44.96 | 0.37 | 0.37 | −2.87 |

While the embodiments have been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:
1. A retroreflective article comprising:
   a retroreflective film comprising opposing front and back surfaces;
   a plurality of retroreflective elements disposed on the back surface of the retroreflective film; and
   a diffusing film having: (1) a full-width half-maximum angle of diffusion of less than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically;
   wherein each of the retroreflective elements comprises a non-equilateral triangular pyramid prism bounded by one of a first set of substantially parallel and v-shaped first grooves, one of a second set of substantially parallel and v-shaped second grooves, and one of a third set of substantially parallel and v-shaped third grooves;
   wherein each of the grooves comprises a groove axis and two intersecting groove sides;
   wherein each groove side of a groove forms a half angle between the groove side and a plane parallel to the groove axis of the groove and orthogonal to the back surface of the retroreflective film; and wherein at least one of the half angles ranges from 25.0 degrees to 28.5 degrees, or ranges from 43.5 degrees to 45.0 degrees.

2. The retroreflective article of claim 1,
wherein each prism has a first, second, and third dihedral angle error; and
wherein the magnitude of each dihedral angle error ranges from 0.01 degrees to 10 degrees.

3. The retroreflective article of claim 2, wherein the magnitude of each third dihedral angle error is greater than 1 degree.

4. The retroreflective article of claim 2,
wherein the magnitude of the average of the first dihedral angle errors is less than 0.3 degrees,
wherein the magnitude of the average of the second dihedral errors is less than 0.3 degrees, and
wherein the average of the third dihedral angle errors is less than −1 degrees.

5. The retroreflective article of claim 1,
wherein adjacent first grooves are separated by a first spacing ranging from 0.1 mm to 0.2 mm;
wherein adjacent second grooves are separated by a second spacing substantially identical to the first spacing; and
wherein adjacent third grooves are separated by a third spacing smaller than the first and second spacing.

6. The retroreflective article of claim 1, wherein the depth of each prism ranges from 1 mil to 5 mils.

7. The retroreflective article of claim 1, wherein each prism is canted face-more-parallel at a cant angle ranging from −5 degrees to −8 degrees.

8. The retroreflective article of claim 1, wherein each prism is canted edge-more-parallel at a cant angle ranging from 4 degrees to 8 degrees.

9. A display system comprising:
the retroreflective article of claim 1;
a projector configured to direct an incident light beam towards the retroreflective article; and
a computer processor operatively connected with a machine-readable non-transitory medium embodying information indicative of instructions for causing the computer processor to perform operations comprising controlling the projector to direct the incident light beam towards the retroreflective article;
wherein the retroreflective article is configured to reflect the incident light beam such that the majority of reflected light is divided into (1) a first reflected light beam offset from the incident light beam by a first reflected angle greater than 1 degree, and (2) a second reflected light beam offset from the incident light beam by a second reflected angle having a magnitude substantially identical to that of the first reflected angle and a direction opposite of the first reflected angle relative to the incident light beam.

10. The display system of claim 9, wherein the first reflected angle is greater than 4 degrees above the incident light beam, and the second reflected angle is greater than 4 degrees below the incident light beam, when the front and back surfaces of the retroreflective film are positioned vertically.

11. A method of displaying an image, the method comprising:
providing a retroreflective article of claim 1;
providing a projector; and
controlling the projector to direct an incident light beam towards the retroreflective article, thereby reflecting the incident light beam into (1) a first reflected light beam offset from the incident light beam by a first reflected angle greater than 1 degree, and (2) a second reflected light beam offset from the incident light beam by a second reflected angle having a magnitude substantially identical to that of the first reflected angle and a direction opposite that of the first reflected angle relative to the incident light beam.

12. The method of claim 11, wherein the first reflected angle is greater than 4 degrees above the incident light beam, and the second reflected angle is greater than 4 degrees below the incident light beam, when the front and back surfaces of the retroreflective film are positioned vertically.

13. A retroreflective article comprising:
a retroreflective film comprising opposing front and back surfaces;
a plurality of retroreflective elements disposed on the back surface of the retroreflective film; and
a diffusing film having: (1) a full-width half-maximum angle of diffusion of less than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically;
wherein each of the retroreflective elements is a non-equilateral triangular pyramid prism comprising a triangular base; and
wherein the triangular base comprises two sides that differ in length from one another such that the ratio of the length of the smaller of the two sides to the length of the larger of the two sides ranges from 80% to 92.5%.

14. The retroreflective article of claim 13,
wherein each prism has a first, second, and third dihedral angle error; and
wherein the magnitude of each dihedral angle error ranges from 0.01 degrees to 10 degrees.

15. The retroreflective article of claim 14, wherein the magnitude of each third dihedral angle error is greater than 1 degree.

16. The retroreflective article of claim 14,
wherein the magnitude of the average of the first dihedral angle errors is less than 0.3 degrees,
wherein the magnitude of the average of the second dihedral errors is less than 0.3 degrees, and
wherein the average of the third dihedral angle errors is less than −1 degrees.

17. The retroreflective article of claim 13,
wherein each of the retroreflective elements comprises a non-equilateral triangular pyramid prism bounded by one of a first set of substantially parallel and v-shaped first grooves, one of a second set of substantially parallel and v-shaped second grooves, and one of a third set of substantially parallel and v-shaped third grooves;
wherein adjacent first grooves are separated by a first spacing ranging from 0.1 mm to 0.2 mm;
wherein adjacent second grooves are separated by a second spacing substantially identical to the first spacing; and
wherein adjacent third grooves are separated by a third spacing smaller than the first and second spacing.

18. The retroreflective article of claim 13, wherein the depth of each prism ranges from 1 mil to 5 mils.

19. The retroreflective article of claim 13, wherein each prism is canted face-more-parallel at a cant angle ranging from −5 degrees to −8 degrees.

20. The retroreflective article of claim 13, wherein each prism is canted edge-more-parallel at a cant angle ranging from 4 degrees to 8 degrees.

21. A retroreflective article comprising:
a retroreflective film comprising opposing front and back surfaces;
a plurality of retroreflective elements disposed on the back surface of the retroreflective film; and
a diffusing film having: (1) a full-width half-maximum angle of diffusion of greater than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically;
wherein each of the retroreflective elements comprises a non-equilateral triangular pyramid prism having a third dihedral angle error with a magnitude greater than 1 degree;
wherein each prism is bounded by one of a first set of substantially parallel and v-shaped first grooves, one of a second set of substantially parallel and v-shaped second grooves, and one of a third set of substantially parallel and v-shaped third grooves;
wherein each of the grooves comprises a groove axis and two intersecting groove sides;
wherein each groove side of a groove forms a half angle between the groove side and a plane parallel to the groove axis of the groove and orthogonal to the back surface of the retroreflective film; and
wherein at least one of the half angles ranges from 25 degrees to 30 degrees.

22. The retroreflective article of claim 21, wherein the third dihedral angle ranges from −1 degrees to −4 degrees.

23. The retroreflective article of claim 21,
wherein adjacent first grooves are separated by a first spacing ranging from 0.1 mm to 0.2 mm;
wherein adjacent second grooves are separated by a second spacing substantially identical to the first spacing; and
wherein adjacent third grooves are separated by a third spacing larger than the first and second spacing.

24. The retroreflective article of claim 21, wherein the depth of each prism ranges from 1 mil to 5 mils.

25. The retroreflective article of claim 21, wherein each prism is canted edge-more-parallel at a cant ranging from 4 degrees to 10 degrees.

26. A retroreflective article comprising:
a retroreflective film comprising opposing front and back surfaces;
a plurality of retroreflective elements disposed on the back surface of the retroreflective film; and
a diffusing film having: (1) a full-width half-maximum angle of diffusion of greater than 1 degree in a horizontal x-direction substantially parallel to the front surface of the retroreflective film when the front and back surfaces of the retroreflective film are positioned vertically, and (2) a full-width half-maximum angle of diffusion of greater than 3 degrees in a vertical y-direction substantially parallel to the front surface of the retroreflective film when the front and back surfaces of the retroreflective film are positioned vertically;
wherein each of the retroreflective elements comprises a non-equilateral triangular pyramid prism bounded by one of a first set of substantially parallel and v-shaped first grooves, one of a second set of substantially parallel and v-shaped second grooves, and one of a third set of substantially parallel and v-shaped third grooves;
wherein each of the grooves comprises a groove axis and two intersecting groove sides;
wherein each groove side of a groove forms a half angle between the groove side and a plane parallel to the groove axis of the groove and orthogonal to the back surface of the retroreflective film;
wherein at least one of the half angles ranges from 25.0 degrees to 30.0 degrees; and
wherein each prism is canted edge-more-parallel at a cant angle greater than 0 degrees.

27. The retroreflective article of claim 26, wherein each prism is canted at a cant angle ranging from 4 degrees to 10 degrees.

28. The retroreflective article of claim 26, wherein each prism has a third dihedral angle error ranging from −4 degrees to −1 degrees.

29. The retroreflective article of claim 26,
wherein adjacent first grooves are separated by a first spacing ranging from 0.1 mm to 0.2 mm;
wherein adjacent second grooves are separated by a second spacing substantially identical to the first spacing; and
wherein adjacent third grooves are separated by a third spacing larger than the first and second spacing.

30. The retroreflective article of claim 26, wherein the depth of each prism ranges from 1 mil to 5 mils.

* * * * *